US008182161B2

(12) United States Patent
Rawlings et al.

(10) Patent No.: US 8,182,161 B2
(45) Date of Patent: May 22, 2012

(54) CONTROLLED FOLD DOCUMENT DELIVERY

(75) Inventors: Timothy W. Rawlings, Waynesville, OH (US); Michael J. VanDemark, Springboro, OH (US)

(73) Assignee: NCR Corporation, Duluth, GA (US)

( * ) Notice: Subject to any disclaimer, the term of this patent is extended or adjusted under 35 U.S.C. 154(b) by 657 days.

(21) Appl. No.: 11/897,755

(22) Filed: Aug. 31, 2007

(65) Prior Publication Data

US 2009/0060606 A1 Mar. 5, 2009

(51) Int. Cl.

| | |
|---|---|
| ***B41F 11/44*** | (2006.01) |
| ***G06K 9/32*** | (2006.01) |
| ***G06K 9/36*** | (2006.01) |
| ***G06F 17/00*** | (2006.01) |

(52) U.S. Cl. ......... 400/76; 358/1.18; 382/287; 382/294; 715/224; 715/244

(58) Field of Classification Search .................... 400/76; 358/1.18; 382/287
See application file for complete search history.

(56) References Cited

U.S. PATENT DOCUMENTS 3,466,423 A 9/1969 Janning
3,518,406 A 6/1970 Janning
3,663,390 A 5/1972 Fergason et al.
3,947,854 A 3/1976 Hansen et al.
4,161,277 A 7/1979 Steiner
4,167,392 A 9/1979 Defago
RE30,116 E 10/1979 Maalouf
4,309,255 A 1/1982 Gendler et al.
4,507,669 A 3/1985 Sakamoto et al.
4,631,596 A 12/1986 Yaguchi
4,708,500 A 11/1987 Bangs et al.
4,806,950 A 2/1989 Sekine et al.
4,853,256 A 8/1989 Obringer et al.

(Continued)

FOREIGN PATENT DOCUMENTS

EP 0552956 7/1993

(Continued)

OTHER PUBLICATIONS

JP Abstract, vol. 007, No. 063 (M-200), Mar. 16, 1983 & JP 57-208298 A (Ricoh KK), Dec. 21, 1982.

(Continued)

*Primary Examiner* — Daniel J Colilla
*Assistant Examiner* — Marissa Ferguson Samreth
(74) *Attorney, Agent, or Firm* — Joseph P. Merhle; Dana T. Hustins

(57) ABSTRACT

There is provided a method to image a dual-sided thermal media including a plurality of contiguous, alternating first and second thermally imageable panels distinguished by one or more associated sense marks, each of the imageable panels including a first and second imageable sides. The method includes determining a starting panel of the alternating first and second thermally imageable panels of the thermal media on which to start imaging one or more received pages of data, determining a starting side of the first and second imageable sides of the starting panel according to number of the one or more received pages of data, advancing the thermal media to the starting panel using at least one of the of the one or more associated sense marks, and imaging the thermal media with the one or more received pages of data starting at the determined starting side of the advanced to determined panel. There are also provided a dual-sided direct thermal printer to image the dual-sided thermal media and the dual-sided thermal media for dual-sided imaging.

15 Claims, 14 Drawing Sheets

U.S. PATENT DOCUMENTS 4,924,275 A 5/1990 Nelson
4,956,251 A 9/1990 Washizu et al.
4,965,166 A 10/1990 Hosoi et al.
4,987,118 A 1/1991 Murata et al.
5,055,373 A 10/1991 Saeki et al.
5,101,222 A 3/1992 Hakkaku
5,130,292 A 7/1992 Ito et al.
5,132,704 A 7/1992 Nakagawa
5,196,297 A 3/1993 Dombrowski, Jr. et al.
5,214,750 A 5/1993 Minowa et al.
5,219,821 A 6/1993 Arbee
5,266,550 A 11/1993 Asajima et al.
5,272,127 A 12/1993 Mandoh et al.
5,284,816 A 2/1994 Stephenson
5,319,392 A 6/1994 Durst et al.
5,339,099 A 8/1994 Nureki et al.
5,366,952 A 11/1994 Granquist
5,398,305 A 3/1995 Yawata et al.
5,428,714 A 6/1995 Yawata et al.
5,437,004 A 7/1995 Miyasaka et al.
5,476,698 A 12/1995 Denny
5,537,550 A 7/1996 Russell et al.
5,555,349 A 9/1996 Miyasaka et al.
5,584,590 A 12/1996 Ito et al.
5,585,321 A 12/1996 Breen et al.
5,594,653 A 1/1997 Akiyama et al.
5,629,259 A 5/1997 Akada et al.
5,639,169 A 6/1997 Aruga
5,667,303 A 9/1997 Arens et al.
5,677,722 A 10/1997 Park
5,686,159 A 11/1997 Langan
5,688,057 A 11/1997 Wright et al.
5,692,110 A 11/1997 Miyasaka et al.
5,707,925 A 1/1998 Akada et al.
5,710,094 A 1/1998 Minami et al.
5,727,135 A 3/1998 Webb
5,741,592 A 4/1998 Lewis et al.
5,754,213 A 5/1998 Whritenor
5,755,521 A 5/1998 Ito et al.
5,756,188 A 5/1998 Reiter et al.
5,763,356 A 6/1998 Ueno et al.
5,781,823 A 7/1998 Isobe et al.
5,789,340 A 8/1998 Brust et al.
5,792,725 A 8/1998 Simpson et al.
5,794,530 A 8/1998 Dobashi et al.
5,800,081 A 9/1998 Teradaira et al.
5,815,191 A 9/1998 Michielsen et al.
5,846,900 A 12/1998 Reiter et al.
5,876,836 A 3/1999 Imamura et al.
5,883,043 A 3/1999 Halbrook, Jr. et al.
5,886,725 A 3/1999 Miyadera et al.
5,918,910 A 7/1999 Stillwagon et al.
5,961,228 A 10/1999 Ward
5,964,541 A 10/1999 Murison et al.
5,980,128 A 11/1999 Verlinden et al.
6,000,726 A 12/1999 Campbell
6,000,867 A 12/1999 Yoshii et al.
6,042,264 A 3/2000 Prusik et al.
6,095,414 A 8/2000 Long et al.
6,106,910 A 8/2000 Tan et al.
6,118,956 A 9/2000 Hirao
6,130,185 A 10/2000 Narita et al.
6,150,067 A 11/2000 Koike et al.
6,151,037 A 11/2000 Kaufman et al.
6,165,937 A 12/2000 Puckett et al.
6,197,722 B1 3/2001 Irving et al.
6,210,517 B1 4/2001 Eadara et al.
6,210,777 B1 4/2001 Vermeulen et al.
6,233,057 B1 5/2001 Ota
6,241,386 B1 6/2001 Limburg et al.
6,258,746 B1 7/2001 Mehta
6,267,052 B1 7/2001 Hill et al.
6,350,072 B1 2/2002 Nunes et al.
6,388,692 B1 5/2002 Iwata et al.
6,416,154 B1 7/2002 Silverbrook
6,523,951 B2 2/2003 Takeya et al.
6,524,000 B1 2/2003 Roth
6,543,808 B1 4/2003 Mitchell, Jr. et al.
6,544,709 B1 4/2003 Wang et al.
6,544,925 B1 4/2003 Prusik et al.
6,562,755 B1 5/2003 Halbrook, Jr. et al.
6,663,304 B2 12/2003 Vives et al.
6,705,786 B2 3/2004 Trovinger
6,737,137 B2 5/2004 Franko, Sr. et al.
6,759,366 B2 7/2004 Beckerdite et al.
6,784,906 B2 8/2004 Long et al.
6,786,263 B1 9/2004 Fox, Jr. et al.
6,801,233 B2 10/2004 Bhatt et al.
6,803,344 B2 10/2004 Halbrook et al.
6,812,943 B1 11/2004 Day et al.
6,906,735 B2 6/2005 Bhatt et al.
6,962,449 B2 11/2005 Lermant et al.
6,962,763 B2 11/2005 Maskasky et al.
6,982,737 B2 1/2006 Elko et al.
7,192,904 B2 3/2007 Iwasaki et al.
7,514,262 B2 4/2009 Ribi
7,520,586 B2 4/2009 Itoh
7,589,752 B2 9/2009 Janning
7,623,145 B2 11/2009 Taguchi
7,671,878 B2 3/2010 Yamada et al.
7,760,370 B2 * 7/2010 Oki ............................... 358/1.1
2001/0034775 A1 10/2001 Minowa
2002/0122188 A1 9/2002 Elko et al.
2002/0124950 A1 9/2002 Klima
2003/0025779 A1 2/2003 Miyazaki
2003/0031861 A1 2/2003 Reiter et al.
2003/0112318 A1 6/2003 Long et al.
2003/0208560 A1 11/2003 Inoue et al.
2004/0046971 A1 3/2004 Lapstun et al.
2004/0084631 A1 5/2004 Spoonhower et al.
2004/0135872 A1 7/2004 Burdenko
2004/0265542 A1 12/2004 Yanagisawa et al.
2005/0020387 A1 1/2005 Kennedy, III
2005/0031392 A1 2/2005 Yamamoto et al.
2005/0146739 A1 7/2005 Rayl et al.
2005/0146740 A1 7/2005 Fukuda
2005/0148467 A1 7/2005 Makitalo et al.
2005/0164881 A1 7/2005 Kenney et al.
2005/0271866 A1 12/2005 Lee
2006/0072001 A1 4/2006 Klein
2006/0289633 A1 12/2006 Moreland et al.
2007/0109349 A1 5/2007 Tanaka et al.
2007/0207926 A1 9/2007 VanDemark et al.
2007/0223022 A1 * 9/2007 Suzuki ......................... 358/1.12
2009/0184510 A1 * 7/2009 Frankel ........................... 283/81
2009/0195584 A1 8/2009 Itoh
2009/0225353 A1 * 9/2009 Ishibashi ...................... 358/1.15
2010/0225932 A1 * 9/2010 Kurose et al. .................. 358/1.1

FOREIGN PATENT DOCUMENTS

EP 0947340 10/1999
EP 1 862 318 5/2007
EP 1 862 319 5/2007
GB 2250478 6/1992
JP 58008668 1/1983
JP 58051172 3/1983
JP 03234560 10/1991
JP 03293171 12/1991
JP H07061141 8/1993
JP 6262786 9/1994
JP H09086041 9/1995
JP 8127152 5/1996
JP 8169127 7/1996
JP 9183427 7/1997
JP 2000315275 11/2000
JP 2001080131 3/2001
JP 2001199095 7/2001
JP 2003251595 9/2003
JP 2006095755 4/2006
JP 2006256289 9/2006
RU 2088969 8/1997
WO 02/096665 12/2002
WO 2004077001 9/2004
WO WO 2004/077001 A1 9/2004
WO 2007102879 9/2007

OTHER PUBLICATIONS

JP Abstract, vol. 007, No. 081 (M-105), Apr. 5, 1983 & JP 58-008668 A (Shinko Denki KK), Jan. 18, 1983.

JP Abstract, vol. 015, No. 194 (M-1114), May 20, 1991 & JP 03-051149 A (Fujitsu General Ltd.), Mar. 5, 1991.

JP Abstract, vol. 2000, No. 24 May 11, 2001 & JP 2001-199095 A (Alps Electric Co. Ltd.), Jul. 24, 2001.

JP Abstract, vol. 1998, No. 08, Jun. 30, 1998 & JP 10-076713 A (Sony Corp.) Mar. 24, 1998.

JP Abstract, vol. 010, No. 151 (M-483), May 31, 1986 & JP 61-003765 A (Konishiroku Shashin Kogyo KK), Jan. 9, 1986.

JP Abstract, vol. 016, No. 041 (M-1206), Jan. 31, 1992 & JP 03-246091 A (Canon Inc.), Nov. 1, 1991.

Boca Systems Micro Plus 2S 2 Sided Printer product brochure which came to the attention of Applicant at a Chicago tradeshow during the summer of 2002.

APTi PowerEcoT R2412 printer brochure, which was came to the attention of Applicant in the summer of 2007, and was translated by Applicant's Japanese Office in the fall of 2007.

* cited by examiner

CONTROLLED FOLD DOCUMENT DELIVERY

TECHNICAL FIELD

This disclosure relates to direct thermal printers. More particularly, example embodiments are directed to a dual-sided thermal media, a dual-sided thermal printer, and a method for imaging a dual-sided thermal media.

BACKGROUND

Desktop cut-sheet laser printers have been commonly used to print a variety of booklets or pamphlets, such as scripts in the retail pharmacy industry in support of prescription fills. Processing these documents is time consuming, wasteful and unreliable using the cut-sheet laser printers, as sheet skew, page jams, and mis-feeds are common problems associated with the cut-sheet laser printers, especially when printing in duplex mode (i.e., on both sides of the sheet). In addition, the cut-sheet desktop laser printers typically rely upon fixed-length sheets (e.g., letter size—8½"×11" and legal size—8½"×14") to print variable amounts of data. As such, fixed-length sheets usually have a limited amount of space available for variable data printing. This necessarily leads to an increase in sheet consumption, as full sheets are used to print partial amounts of data. Furthermore, in regard to the retail pharmacy industry, as the sheets for each script and for the scripts of the different prescription fills are by definition printed on separate sheets, there is a great possibility for misplacement and loss of the sheets, as well as an increased probability that the sheets may end up in the wrong hands. The latter is of concern as the scripts may contain personal and/or confidential information.

In view of the foregoing, fanfold media (e.g., media that is cross-perforated and/or folded alternately in accordion fashion to form a plurality of panels) may be used with, for example, dot-matrix or thermal printers, to print or image documents (e.g., booklets or pamphlets) of various sizes. However, in such case as the amount of data (e.g., panels) printed may vary from document to document (e.g., booklet or pamphlet), the first or front panel (e.g., first sheet or page of the first of front panel) of any particular document may open to the wrong side (e.g., from left to right instead of right to left) making use of such document difficult and/or inconvenient. Worse yet, the first sheet (page) of the front panel of such a document may fanfold to the interior of the printed document based on its original fan-folded orientation. Furthermore, as the data transmissions for documents are generally printed in the first-in-first-out (FIFO) fashion, the panel which is printed first invariably ends up fan-folding to the bottom of the particular pamphlet followed by other panels. Because such fan-folded documents may open to the wrong side, may have their first or front panel fanfold to the interior, and the first or front panel invariably fanfolds to the bottom, printing is inconsistent and inconvenient, and further requires greater handling, especially in the retail pharmacy industry.

SUMMARY

In accordance with an embodiment, there is provided a method to image a dual-sided thermal media comprising a plurality of contiguous, alternating first and second thermally imageable panels distinguished by one or more associated sense marks, each of the imageable panels including a first and second imageable sides, the method comprising: determining a starting panel of the alternating first and second thermally imageable panels of the thermal media on which to start imaging one or more received pages of data; determining a starting side of the first and second imageable sides of the starting panel according to number of the one or more received pages of data; advancing the thermal media to the starting panel using at least one of the of the one or more associated sense marks; and imaging the thermal media with the one or more received pages of data starting at the determined starting side of the advanced to determined panel.

In accordance with another embodiment, there is provided a dual-sided thermal printer to image a dual-sided media comprising a plurality of contiguous, alternating first and second thermally imageable panels distinguished by one or more associated sense marks, each of the imageable panels including a first and second imageable sides, the printer comprising: a first print head positioned proximate to a first platen; a second print head positioned proximate to a second platen, the first print head being in a substantially opposed relation to the second platen and the second print head being in a substantially opposed relation to the first platen; and a microprocessor adapted to: determine a starting panel of the alternating first and second thermally imageable panels of the thermal media on which to start imaging one or more received pages of data; determine a starting side of the first and second imageable sides of the starting panel according to number of the one or more received pages of data; control advancement of the thermal media to the starting panel using at least one of the of the one or more associated sense marks; and control activation of the first print head and the second print head to image the thermal media with the one or more received pages of data starting at the determined starting side of the advanced to determined panel.

In accordance with yet another embodiment, there is provided a dual-sided thermal media, the thermal media comprising: a plurality of contiguous, alternating first and second thermally imageable panels of a predetermined length and a predetermined width, the successive panels delineated by a plurality of cross perforations along the predetermined width; and a plurality of alternating sense marks to distinguish the contiguous, alternating first and second thermally imageable panels

BRIEF DESCRIPTION OF THE DRAWINGS

Various features and attendant advantages of the example embodiments will be more fully appreciated as the same becomes better understood when considered in conjunction with the accompanying drawings, in which like reference characters designate the same or similar parts throughout the several views, and wherein.

DETAILED DESCRIPTION

Dual-sided direct thermal printing of documents, such as transaction documents and receipts, is described in U.S. Pat. Nos. 6,784,906 and 6,759,366. In dual-sided direct thermal printing, the printer is configured to allow concurrent printing on both sides of a thermal media moving along a feed path through the thermal printer. In such a printer, a direct thermal print head is disposed on each side of the thermal media along the feed path. In operation, each thermal print head faces an opposing platen across the thermal media from the respective print head. During printing, the opposing print heads selectively apply heat to the opposing sides of the thermal media, which comprises a substrate with a thermally sensitive coating on each of the opposing surfaces of the substrate. The coating changes color when heat is applied, such that printing is provided on the coated substrate.

Figure 1:
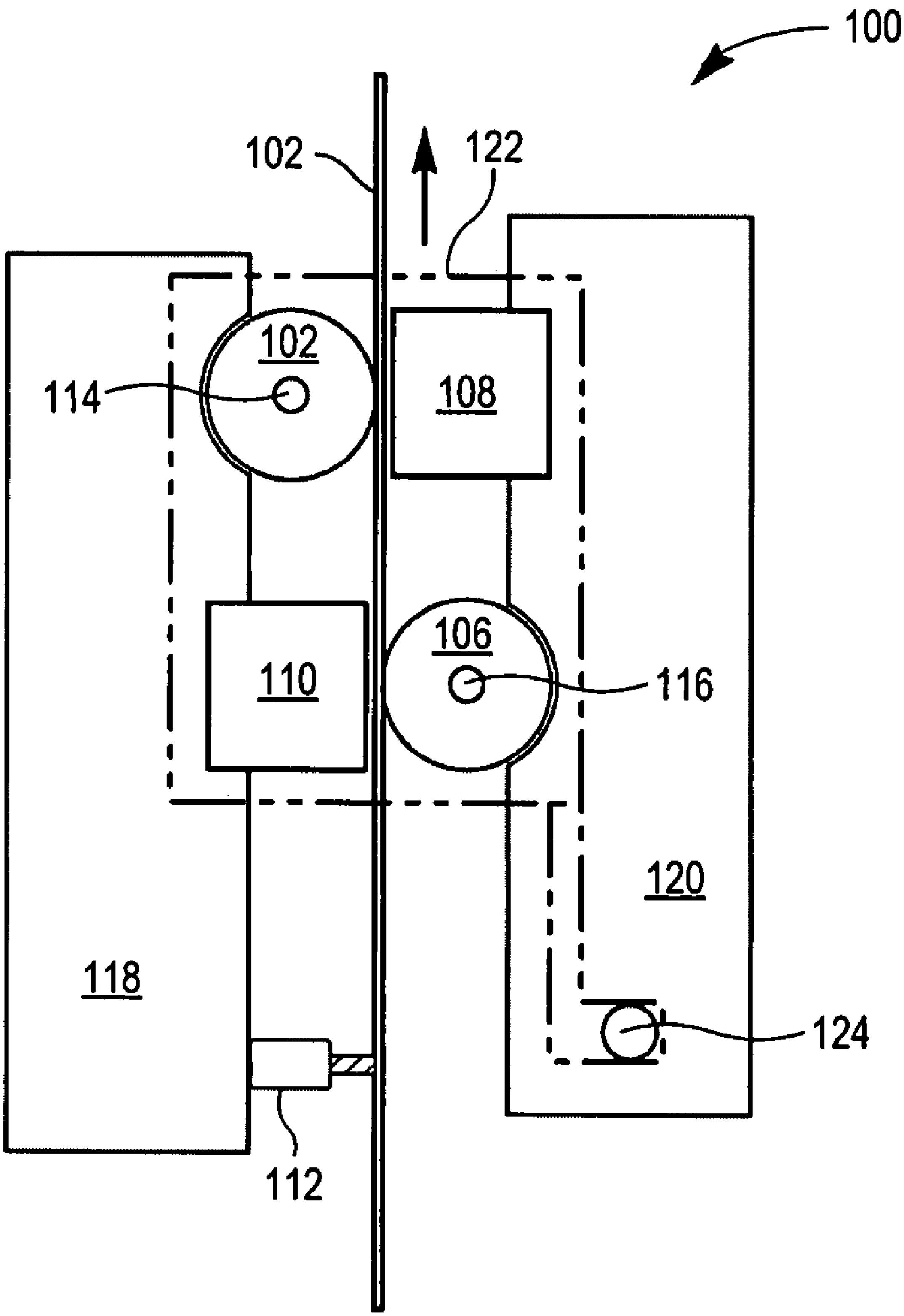
FIG. 1 illustrates a schematic of an example dual-sided imaging direct thermal printer.

FIG. 1 illustrates a schematic of an example dual-sided imaging direct thermal printer 100 useable for dual-sided printing of thermal print media 102 to produce one or more variable length booklets or pamphlets (e.g., "documents"). It is to be noted that printer 100 may print a variety of other documents such as vouchers, coupons, receipts or tickets along with, or separate from, the one or more variable length booklets or pamphlets. Thermal printer 100 comprises support arms 118 and 120. Second support arm 120 may be journaled on an arm shaft 124 to permit arm 120 to pivot or rotate in relation to arm 118. The support arms 118 and 120 may also be in a fixed relation to one another. Thermal printer 100 further comprises platens 104 and 106 and opposing thermal print heads 108 and 110 on opposite sides of the thermal print media 102. More specifically, first support arm 118 comprises a first platen 104 and a first print head 110, and the second support arm 120 comprises a second platen 106 and a second print head 108. The platens 104 and 106 are substantially cylindrical in shape, although other shapes (e.g., flat or plate-type platens) are also possible. The first platen 104 may be journaled on a first shaft 114 and the second platen 106 may be journaled on a second shaft 116. Each of shafts 114 and 116 are coupled to the support arms 118 and 120, respectively. Platens 104 and 106 are further rotatable via drive assembly 122 about shafts 114 and 116, respectively, for moving thermal print media 102 through the printer 100. The drive assembly 122 comprises a motor (not shown) for powering a system of gears, links, cams, and combinations thereof. The first and second print heads 108 and 110 may be any print heads suitable for direct thermal printing, such as those disclosed in U.S. Pat. Nos. 3,947,854; 4,708,500; and 5,964,541.

Further with reference to FIG. 1, thermal printer 100 comprises a sensor 112 for detecting one or more predetermined sense marks on the print media 102 as it is moved through the thermal printer 100. The sensor 112 may be an optical sensor, such as a transmissive or a reflective sensor. It may further employ a variety of light sources for detection, e.g., infrared, visible red, blue-green and the like. The sensor 112 may also have a fine, medium or course focal point or aperture for detecting the one or more predetermined sense marks on the print media 102. The focal point or the aperture used may be selected based on the particular dimensions of the one or more predetermined sense marks, which are elucidated in greater detail below with reference to FIG. 2A. The sensor 112 may also be a proximity switch or a depth sensor. Although only one sensor 112 is shown for brevity and clarity, it is noted that a plurality of sensors 112 (e.g., a second sensor situated for sensing on an opposite side of the thermal media 102) or other types of sensors, such as proximity sensors, depth sensors, electrical sensors, mechanical sensors, and the like, may be provided for detecting various sense marks on the print media 102 in accordance with the various embodiments described hereinafter in FIGS. 2A-3C. Furthermore, additional sensors may be provided for determining various conditions to control the operation of the thermal printer 100, such as a media sensor to detect a paper out condition.

Yet further with reference to FIG. 1, thermal printer 100 operates on thermal print media 102, which may be supplied in the form of a continuous fan-folded stack upon which features such as graphics or text, and combinations thereof may be printed on one or both sides thereof, to provide the printed document, such as for example, a pamphlet or booklet (e.g., pharmacy script), or any other articles or documents described hereinabove. Thermal print media 102 for printing pamphlets or booklets will be described in greater detail with reference to FIGS. 2A-3C. Thermal print media 102 may be a double-sided thermal paper, e.g., comprising a cellulosic or polymer substrate sheet coated on each side with heat sensitive dyes as described in U.S. Pat. Nos. 6,784,906 and 6,759,366; the contents of which are incorporated by reference herein. Dual-sided direct thermal printing may be facilitated by, for example, thermal print media 102, which includes dyes on opposite sides of the print media 102, and a sufficiently thermally resistant substrate that inhibits thermal printing on one side of the print media 102 from affecting thermal printing on the opposite side of print media 20.

Still further with reference to FIG. 1, the dual-sided direct thermal printing of the print media 102 may be accomplished in a single pass process through the simultaneous or substantially simultaneous application of heat to the print media 102 by the first and the second thermal print heads 108, 110. Alternately, dual-sided direct thermal printing may be accomplished in a process where the media 102 may be imaged by one or both of the thermal print heads 108 and 110 when moving in a first direction, and then retracted for further imaging by the other of the one or both thermal print heads 108 and 110 with the media moving in either the first or the second, retract direction. Once printing is completed, the print media 102 may be manually or automatically cut or detached to form the printed document (e.g., pamphlet or booklet), which is described in greater detail below with reference to FIGS. 2A-7. In situations where the printed document is a pharmacy script, the detached portion of the print media 102 may be fan-folded into a booklet or pamphlet, which is also described in greater detail below with reference to FIGS. 2A-7.

Figure 2A:
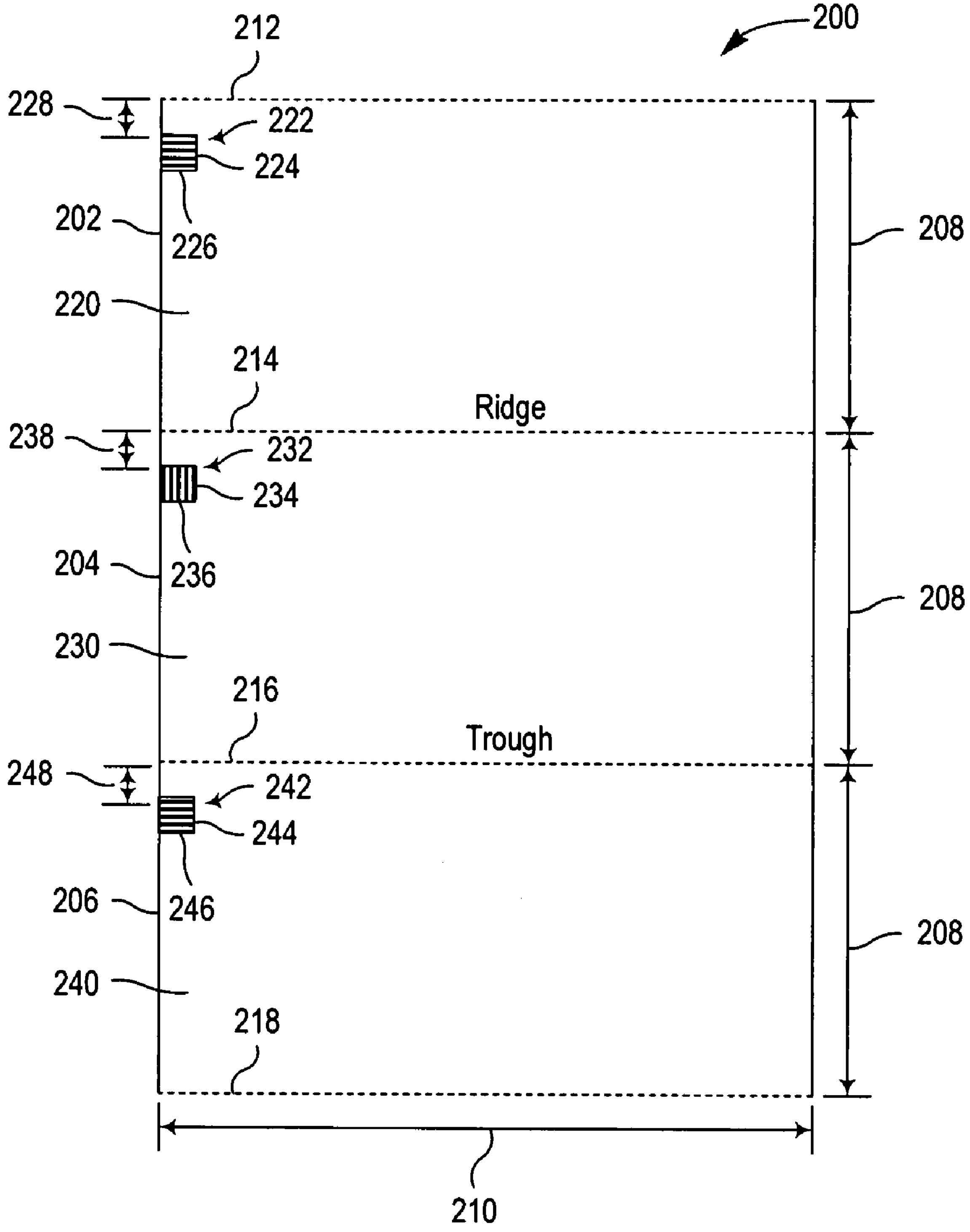
FIGS. 2A-2B illustrate an example embodiment including an example first side and an example second side, respectively, of a portion of a dual-sided fanfold thermal print media for printing a pharmacy script using the example dual-sided imaging direct thermal printer, in accordance with FIG. 1.

FIG. 2A illustrates an example first side 200 of a portion of the dual-sided thermal print media 102 in accordance with an example embodiment for printing a pamphlet or booklet (e.g., pharmacy script) using the example dual-sided imaging direct thermal printer 100 of FIG. 1. As was described hereinabove with reference to FIG. 1, thermal print media 102 may be supplied in a continuous thermal fan-folded stack for printing booklets or pamphlets, such as pharmacy scripts, using the dual-sided imaging direct thermal printer 100. It is to be noted that the example portion illustrated in FIG. 1 is representative of the thermal fan-folded print media stack. Panels 202-206 which are delineated by cross-perforations 212-218 are representative of the continuous thermal fan-folded print media stack. More specifically, the continuous thermal print media stack comprises a multiplicity of panels, such as panels 202-206. Each of the panels 202-206 has a predetermined length 208 and a predetermined width 210. The predetermined length 208 may be about 5½ inches and the predetermined width 210 may be about 8½ inches. The range of the predetermined length 208 may be from about 3 inches to about 14 inches and the range of the predetermined width 210 may be from about 3 inches to about 8½ inches. It is noted that the predetermined length 208 and predetermined width 210 of the panels 202-206 may be selected based on particular size requirements for the document, e.g., booklet or pamphlet.

Further reference to FIG. 2A, panels 202-206 may be delineated by cross-perforations 212-218. More specifically, panel 202 may be delineated by cross-perforation 212 along the width of the top edge and by cross-perforation 214 along the width of the bottom edge. Panel 204 may be delineated by cross-perforation 214 along the width of its top edge and by cross-perforation 216 along the width of its bottom edge. Lastly, panel 206 may be delineated by cross-perforation 216 along the width of its top edge and by cross-perforation 218 along the width of its bottom edge. It is important to note that because the continuous thermal print media 102 (represented by panels 202-206) may be folded into the continuous thermal fan-folded paper stack, the cross-perforations between the panels 202-206 may alternate between troughs and ridges, indicating a folding direction between the respective panels 202-206. For example, cross-perforation between panels 202 and 204 may be a ridge (e.g., indicating a first folding direction out of the plane of FIG. 2A), while the cross-perforation 216 between panels 204, 206 may be a trough (e.g., indicating a second folding direction into the plane of FIG. 2A). Thus, panels 202 and 204 may be folded in the opposite folding direction from the folding direction of panels 204 and 206.

Still further with reference to FIG. 2A, panels 202-206 further comprise respective imaging or printing surfaces 220, 230 and 240 for imaging graphics, text and/or combinations thereof. Imaging surfaces 220, 230 and 240 may comprise respective sense marks 222, 232 and 242 for detection by the sensor 112 of printer 100. It is to be noted that the thermal print media 102 may be positioned in the printer 100 with the sense marks 222, 232 and 242 facing the sensor 112. Each of the sense marks 222, 232 and 242 is related to a respective cross-perforation 212, 214 and 216 and may be used to identify whether the cross-perforation 212, 214 and 216 forms a trough or a ridge to facilitate identification of fan-fold directions between respective panels. More specifically, alternating sense marks 232, 242 may be of different types, shapes, sizes, or locations, in relation to respective cross-perforations 214, 216, to facilitate identification of different fan-fold directions between respective panels 202, 204 and 204, 206. Sense mark 222 is the same as sense mark 242. The alternating sense marks 232, 242 are repeated throughout the dual-sided thermal print media 102 to facilitate identification of the fan-fold directions between respective panels.

Yet further with reference to FIG. 2A, each of the alternating sense marks 222, 232 and 242 has a respective predetermined length 224, 234, 244 and a respective predetermined width 226, 236 and 246 to enable detection by the sensor 112 and further to facilitate identification of the fan-fold directions between respective panels. For example, the length 234 or width 236 of sense mark 232 may be different from the length 244 or width 246 of alternating sense mark 242 to facilitate identification of the fan-fold directions between respective panels 202, 204 (first fan-fold direction) and 204, 206 (second fan-fold direction). Thus, different dimensions (length or width, or both) for alternating sense marks 222, 242 may be used to identify whether the respective associated cross-perforation 214, 216 forms a trough or a ridge. As an example, a sense mark may be a square with a predetermined length and the predetermined width of about ¼ of inch. The range of the predetermined length may be from about 0.10 of inch to about ¼ of inch, and the range of the predetermined width may be from about 0.10 of an inch to about 1 inch. The difference in dimensions is sufficient for the sensor 112 to identify the sense mark 232, 242 and to identify the fan-fold directions of the associated cross-perforation 214, 216 (e.g., trough or a ridge). Alternate dimensions may easily be employed as desired. It should be noted that in some embodiments, similar sense marks (e.g., sense marks 222 and 242) may be provided on alternating panels (e.g., panels 202 and 206, but not 204) of a given side 200 of thermal media 102 rather than having sense marks on each panel.

Additionally with reference to FIG. 2A, the sense marks 222, 232, 242 may be positioned or disposed in coincidence an edge of the print media 102 such as with the left edge of the first side 200, and at respective predetermined distances 228, 238 and 248 from the respective associated top edge cross-perforations 212, 214 and 216. The range of the predetermined distances 228, 238 and 248 may vary from about ¼ of inch up to the length 208 of the respective panels 202, 204, 206. In addition to using the dimensions of alternating sense marks to identify associated types of cross-perforations (e.g., fan-fold directions between respective panels), alternating positions of similarly-sized sense marks may also be used to identify the type of respective associated cross-perforation 212-216 (e.g., fan-fold directions between respective panel). For example, sense mark 232 that may be disposed a ¼ of an inch (e.g., predetermined distance 238) from an associated cross-perforation 214 may indicate that the associated cross-perforation 214 forms a ridge, while sense mark 242 that may be disposed a ½ an inch (e.g., predetermined distance 248) from an associated cross-perforation 216 may indicate that the associated cross-perforation 216 forms a trough. In operation, the sensor 112 of FIG. 1 may detect a cross-perforation 214, 216 and an associated sense mark 232, 242, and based on the detection may further determine the predetermined distance 238, 248 between the cross-perforation 214, 216 and the associated sense mark 232, 242. Alternate distances of sense marks 222, 232, 242 from associated cross-perforations 212, 214, 216 on respective panels 202, 204, 206 may easily be employed as may be desired. In other embodiments, a first sensor 112 may detect a cross-perforation and a second sensor 112 may detect a sense mark. Variations including embodiments where spacing between alternating sense marks (e.g., spacing between sense marks 222 and 232 versus spacing between sense marks 232 and 242) is determined (e.g., length 208 minus distance 228 plus distance 238 versus length 208 minus distance 282 plus distance 248) are also possible.

Figure 2B:
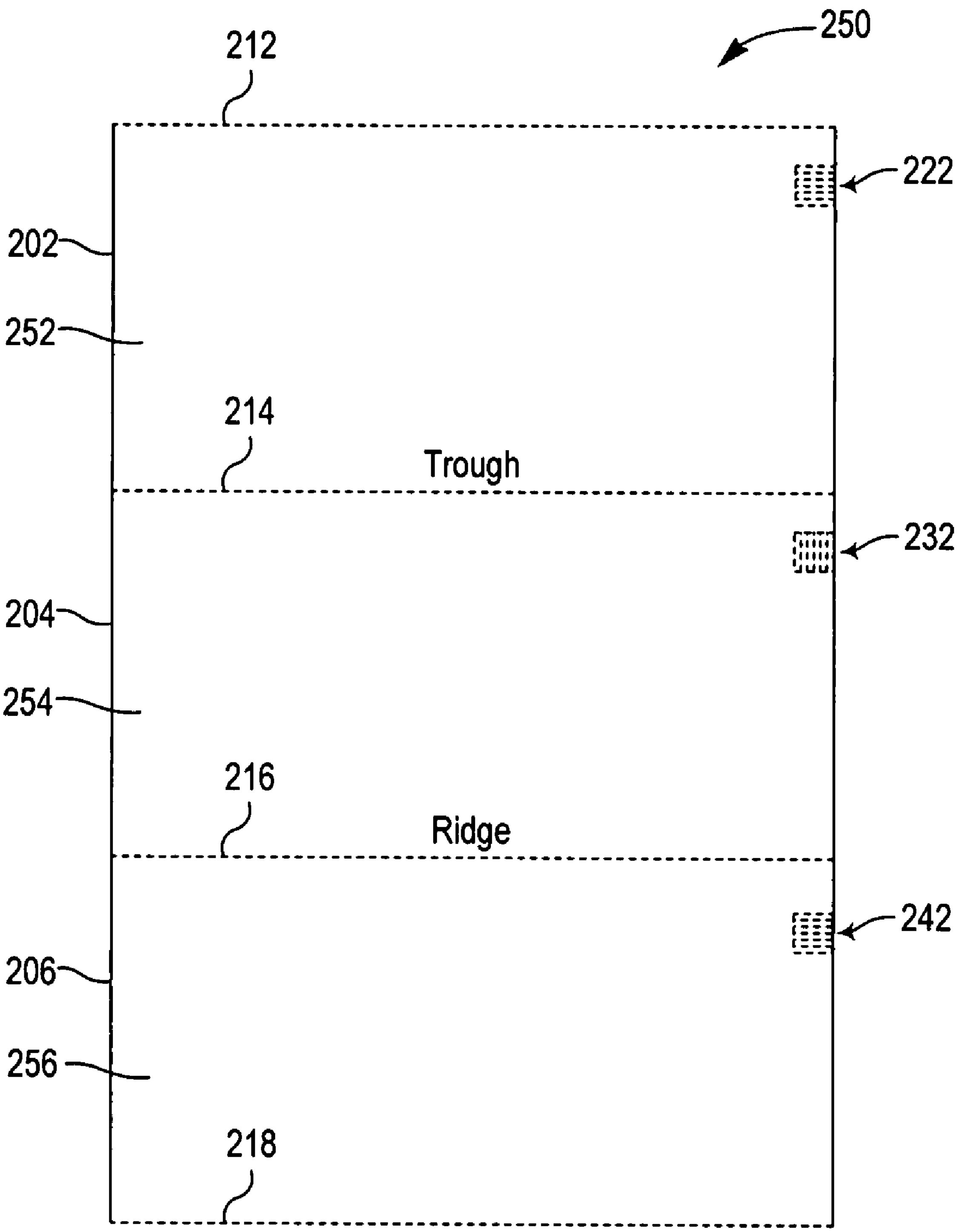

FIG. 2B illustrates an example second reverse side 250 of a portion of the dual-sided thermal print media 102 in accordance with the example embodiment of FIG. 2A for printing a pamphlet or booklet (e.g., pharmacy script) using the example dual-sided imaging direct thermal printer 100 of FIG. 1. Panels 202, 204, 206 of the second side 250 comprise respective imaging or printing surfaces 252, 254, 256 for imaging graphics, text and a combination thereof. Although no sense marks are positioned or disposed in coincidence with the left edge of the second side 250, such sense marks may be provided on the second side 250 (e.g., in coincidence with the left edge thereof) as desired. This may accommodate the placement of the thermal print media 102 with the first side 200 or the second side 250 facing sensor 112.

Further with reference to FIG. 2B, it should be noted that the cross-perforations 212, 214, 216, 218 on the second side 250 are the reverse of the first side, e.g., indicating reverse fan-fold directions between respective panels 202, 204, 206. As such, either the dimension or the position of the sense marks may be chosen to indicate the appropriate fan-fold direction (e.g., cross-perforation forming a ridge or a trough), as described hereinabove with reference to FIG. 2A. For example cross-perforation 214 forms a trough and cross-perforation 216 forms a ridge. In contrast to cross-perforation 214 of the first side 200, cross-perforation 214 of the second side 250 forms a trough. Similarly, in contrast to cross-perforation 216 of the first side 200, cross-perforation 216 of the second side 250 forms a ridge. Because the pamphlet or booklet (e.g., pharmacy script) is fan-folded, sense marks on one of the first side 200 and the second side 250 may be visible on the outside of the pamphlet when it is printed. As such, sense marks may be provided on one side only so that they may be fan-folded to the interior once the pamphlet or booklet is printed. However, sense marks 222, 232 and 242 disposed on the first side 200 are shown on the second side 250 with dashes (e.g., in hidden line form) for reference purposes only.

Figure 2C:
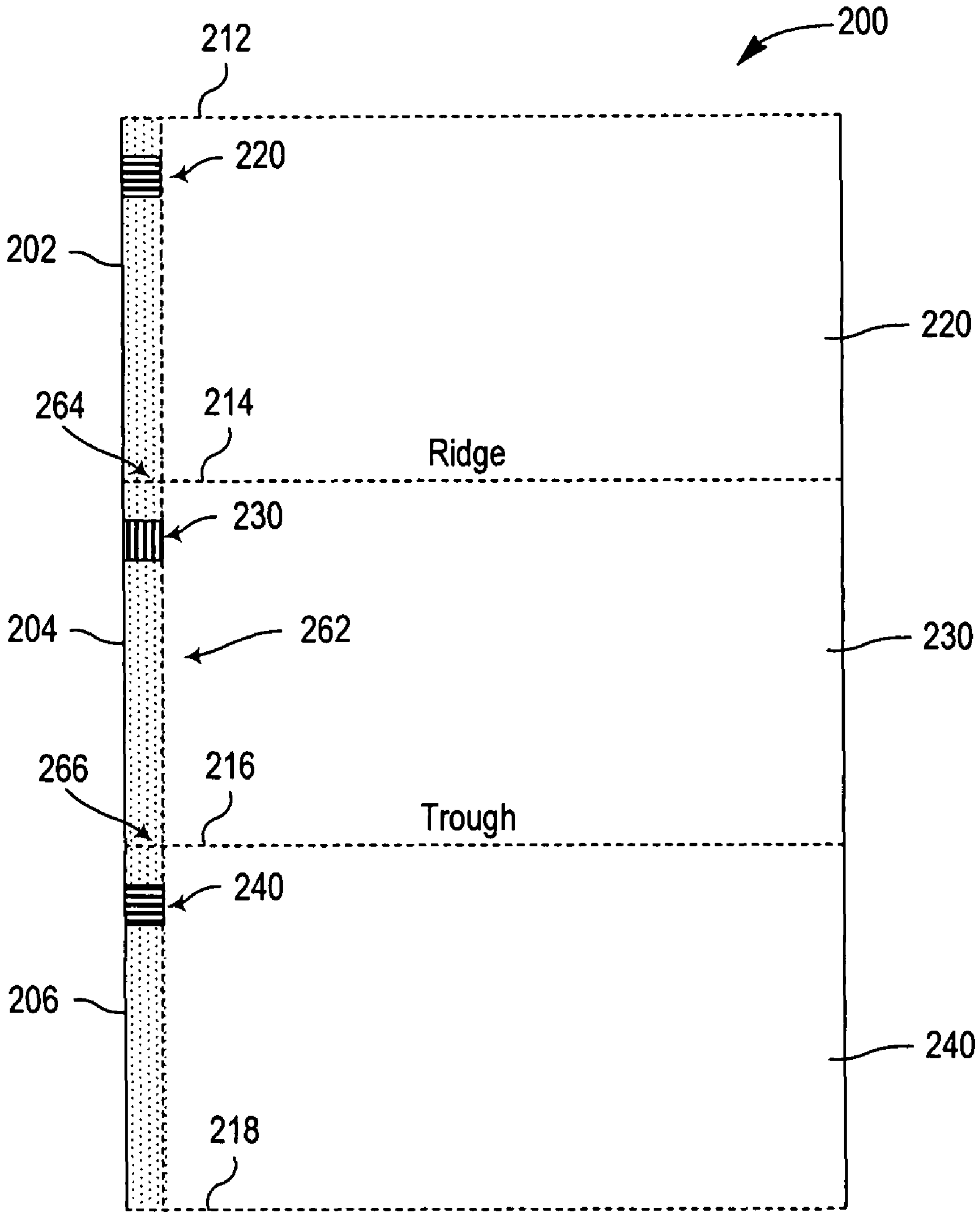
FIG. 2C illustrates an example vertical clear zone scanned by the dual-sided imaging direct thermal printer of FIG. 1 to detect one or more cross-perforations and/or one or more sense marks in accordance with FIGS. 2A-2B.

FIG. 2C illustrates an example vertical clear zone 262 representing a region or area of the print media 102 to be scanned or otherwise sensed by the dual-sided imaging direct thermal printer 100 of FIG. 1 with respect to first side 200 to detect one or more cross-perforations 212, 214, 216, 218 and/or one or more sense marks 222, 232, 242 in accordance with FIGS. 2A-2B. The vertical clear zone 262 may be stored in a memory of the thermal printer 100 and may further be provided to the thermal printer via a communications controller by a host or auxiliary system, such as a point-of sale terminal (POS) (not shown) or a computer (not shown). The predefined vertical clear zone 262 may be adjustable as may be desired. The vertical clear zone 262 may be predefined to cover an area where, for example, all or some of the cross-perforations 214, 216 (represented by respective cross-perforation segments 264, 266) and/or sense marks 232, 242 in accordance with FIG. 2A may be disposed on the thermal print media 102 and where the sensor 112 may scan the thermal print media 102 as it may be moved along the feed path. To mitigate interference with detection, there should be no other printing on the thermal print media 102 in the vertical clear zone 262 where the sensor 112 may scan for cross-perforation segments 264, 266 and/or sense marks 232, 234, for example. A sensor 112 (including related control electronics) may, however, be enabled to discriminate between alternating or similarly-sized sense marks 222, 232, 242 and/or other printing in the vertical clear zone 262, such as for example, based on dimensions of the sense marks (e.g., widths and lengths), their location (e.g., distance from the respective associated cross-perforations via cross-perforation segments), and/or other machine readable characteristics (e.g., optical properties, mechanical properties, electrical properties, and the like).

Lastly with reference to FIGS. 2A-2C, the formation of the sense marks (e.g., sense marks 222, 232, 242) and cross-perforations (e.g., 212, 214, 216, 218) on the dual-sided thermal print media 102 are described. The formation of the sense marks and the cross-perforations may follow the manufacturing process of the thermal print media 102 that is described in U.S. Pat. No. 6,784,906, which is incorporated by reference herein. The sense marks and the cross-perforations may be formed concurrently via a media converting process, which prints the sense marks and registers (or associates) the cross-perforations to the respective sense marks. In an embodiment, the media converting process may utilize a printing press to print the sense marks (e.g., alternating or similar sense marks) on the thermal print media 102 and to form the cross perforations, registering the cross perforations to the respective sense marks, to facilitate identification of fan-fold directions between respective panels (e.g., cross perforations forming a trough or ridge). The printing press may employ lithographic, ultra violet lithographic, or flexographic printing. Other printing methods, such as the gravure method, may also be employed in the media converting process. In another embodiment, the media converting process may also utilize thermal printing techniques to image the sense marks (alternating or similar) in combination with the registration of the cross perforations to the respective sense marks so as to enable identification of different types of alternating cross-perforations (e.g., trough, ridge). In a further embodiment, the media converting process may create alternating or similar sense marks in the form of holes, slits and the like in the thermal print media 102, and may dispose similar sense marks at different distances from related cross-perforations, to facilitate identification of different types of alternating perforations (e.g., trough, ridge). Concurrent formation of the sense marks and the cross perforations ensures integrity or precise registration between the sense marks and cross perforations. In yet another embodiment, the cross perforations 212-218 may used as alternating sense marks (e.g., trough, ridge). More specifically, the perforation and subsequent folding of panels 202-206 in the continuous folded stack creates cross-perforations 212-218 that may be identified by a sensor 112 as forming troughs or a ridges.

Figure 3A:
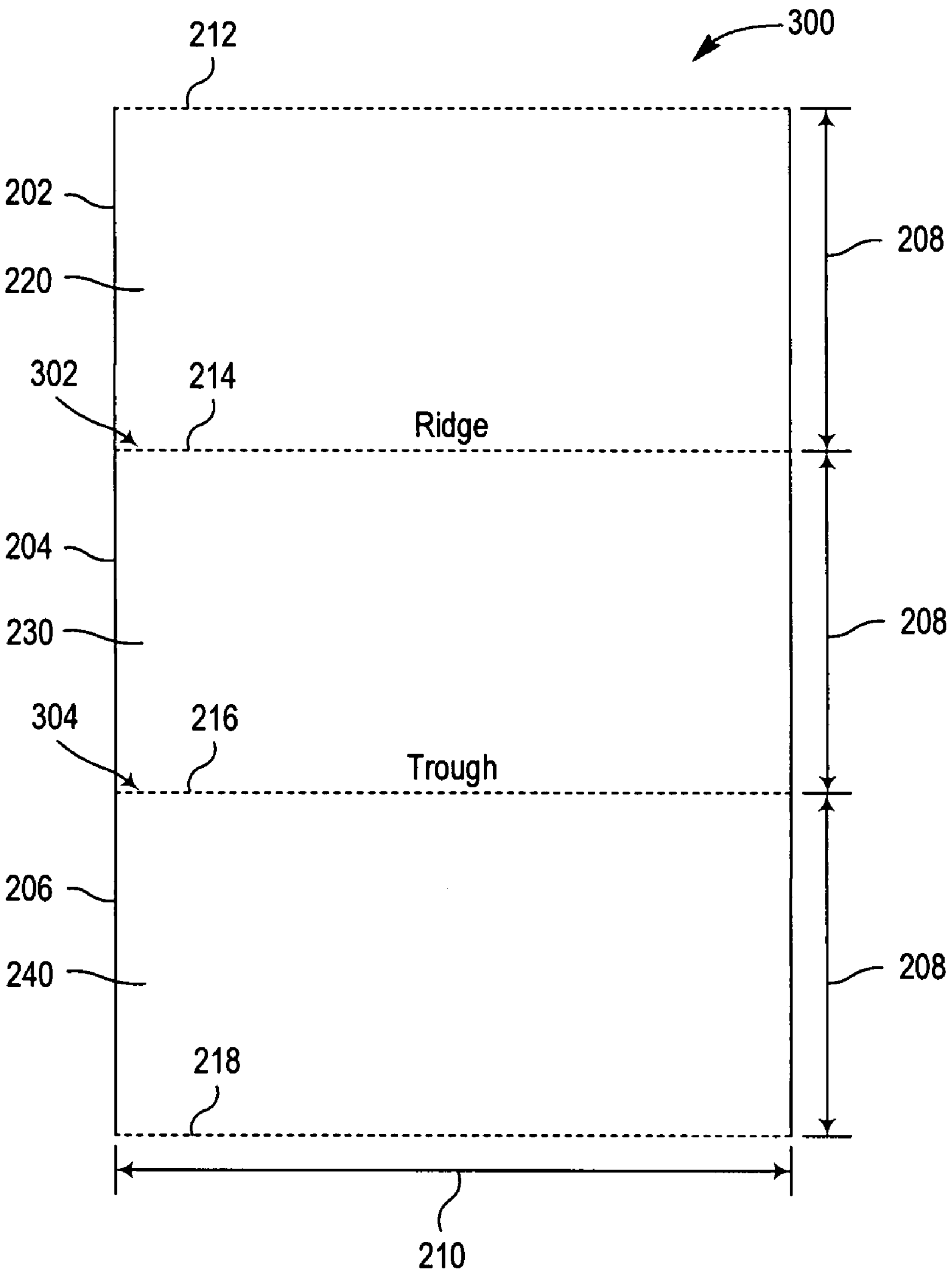
FIGS. 3A-3B illustrate another example embodiment including an example first side and an example second side, respectively, of a portion of a dual-sided fanfold thermal print media for printing a pharmacy script using the example dual-sided imaging direct thermal printer, in accordance with FIG. 1.

FIG. 3A illustrates an example first side 300 of a portion of the dual-sided thermal print media 102 in accordance with another example embodiment for printing a pamphlet or booklet (e.g., pharmacy script) using the example dual-sided imaging direct thermal printer 100 of FIG. 1. As described above with reference to FIG. 2A, cross-perforations 212, 214, 216, 218 delineate panels 202, 204, 206 that are representative of the continuous thermal fan-folded print media stack. The predetermined length 208 and a predetermined width 210 of panels 202, 204, 206 may be selected based on particular size requirements for the document, e.g., booklet or pamphlet. Because the continuous thermal print media 102 (represented by panels 202, 204, 206) may be folded into a continuous thermal fan-folded paper stack, the cross-perforations 214, 216 between the panels 202, 204, 206 may alternate between forming ridges and troughs, which may be used as alternating sense marks 302, 304 that may be detected by sensor 112 of FIG. 1 to indicate a folding direction between the respective panels 202, 204, 206. For example, a sense mark 302 in a form of a ridge may indicate adjacent panels 202 and 204 may fold to form a ridge on a first side 300 of the print media 102 (e.g., indicating a first folding direction out of the plane of FIG. 3A), while a further sense mark 304 in the from of a trough may indicate that adjacent panels 204, 206 may fold to form a trough on the first side 300 of the print media 102 (e.g., indicating a second folding direction into the plane of FIG. 3A). In this embodiment, the alternating sense marks 302, 304 do not visually obstruct the imaging surfaces 220, 230 and 240 and yet facilitate detection by the sensor 112 of the printer 100. It is noted that the alternating sense marks are repeated naturally throughout the fan-folded dual-sided thermal print media 102 and facilitate identification of the fan-fold directions between respective panels.

Figure 3B:
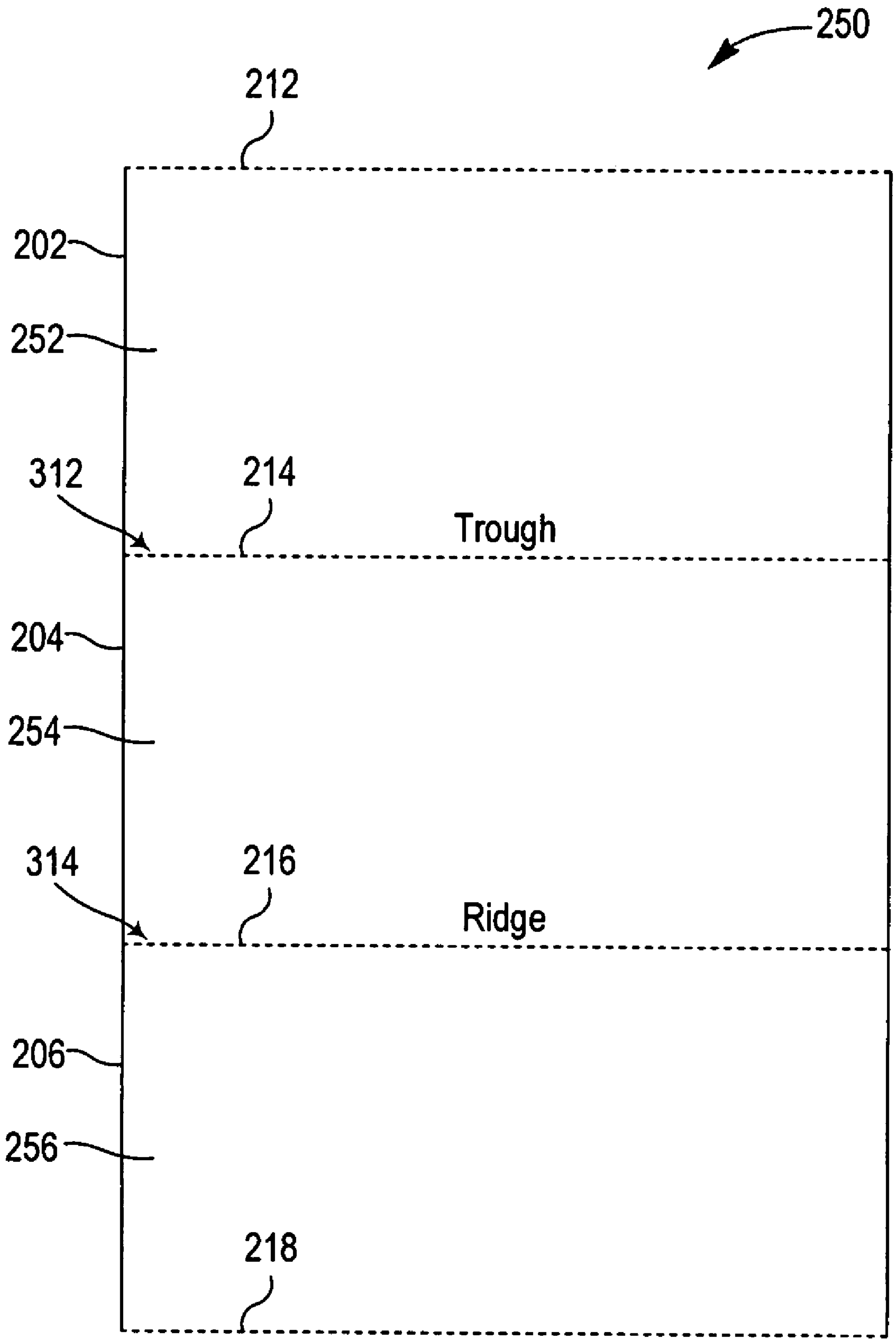

FIG. 3B illustrates an example second (reverse) side 310 of a portion of the dual-sided thermal print media 102 in accordance with the example embodiment of FIG. 3A for printing a pamphlet or booklet (e.g., pharmacy script) using the example dual-sided imaging direct thermal printer 100 of FIG. 1. As described above with reference to FIG. 3A, cross-perforations 212, 214, 216, 218 delineate panels 202, 204, 206 that are representative of a continuous thermal fan-folded print media stack. Because the continuous thermal print media 102 (represented by panels 202, 204, 206) may be folded into the continuous thermal fan-folded paper stack, the cross-perforations 214, 216 between the panels 202, 204, 206 may alternate between forming ridges and troughs, which may be used as alternating sense marks 312, 314 that may be detected by sensor 112 of FIG. 1 to indicate a folding direction between the respective panels 202, 204, 206. For example, a sense mark 312 in the form of a trough may indicate that adjacent panels 202 and 204 may fold to form a trough (e.g., indicating a second folding direction into the plane of FIG. 3B), while a further sense mark 314 in the form of a ridge may indicate that adjacent panels 204 and 206 may fold to from a ridge (e.g., indicating a first folding direction out of the plane of FIG. 3B). It should be noted, however, that the sense marks 312, 314 (e.g., trough and ridge) on the second side 310 are the reverse of the sense marks 302, 304 (i.e., ridge and trough) of first side 300, indicating the reverse fan-fold directions between respective panels 202, 204, 206 on respective sides 300, 310. For example, a trough sense mark 312 indicates that associated cross-perforation 214 forms a trough and ridge sense mark 314 indicates that associated cross-perforation 216 forms a ridge. In contrast, a ridge sense mark 302 indicates that cross-perforation 214 forms a ridge and trough sense mark 304 indicates cross-perforation 216 forms a trough. As noted before, the alternating sense marks 312, 314 are repeated naturally throughout the fan-folded dual-sided thermal print media 102 and facilitate identification of the fan-fold directions between respective panels without additional making thereof.

Figure 3C:
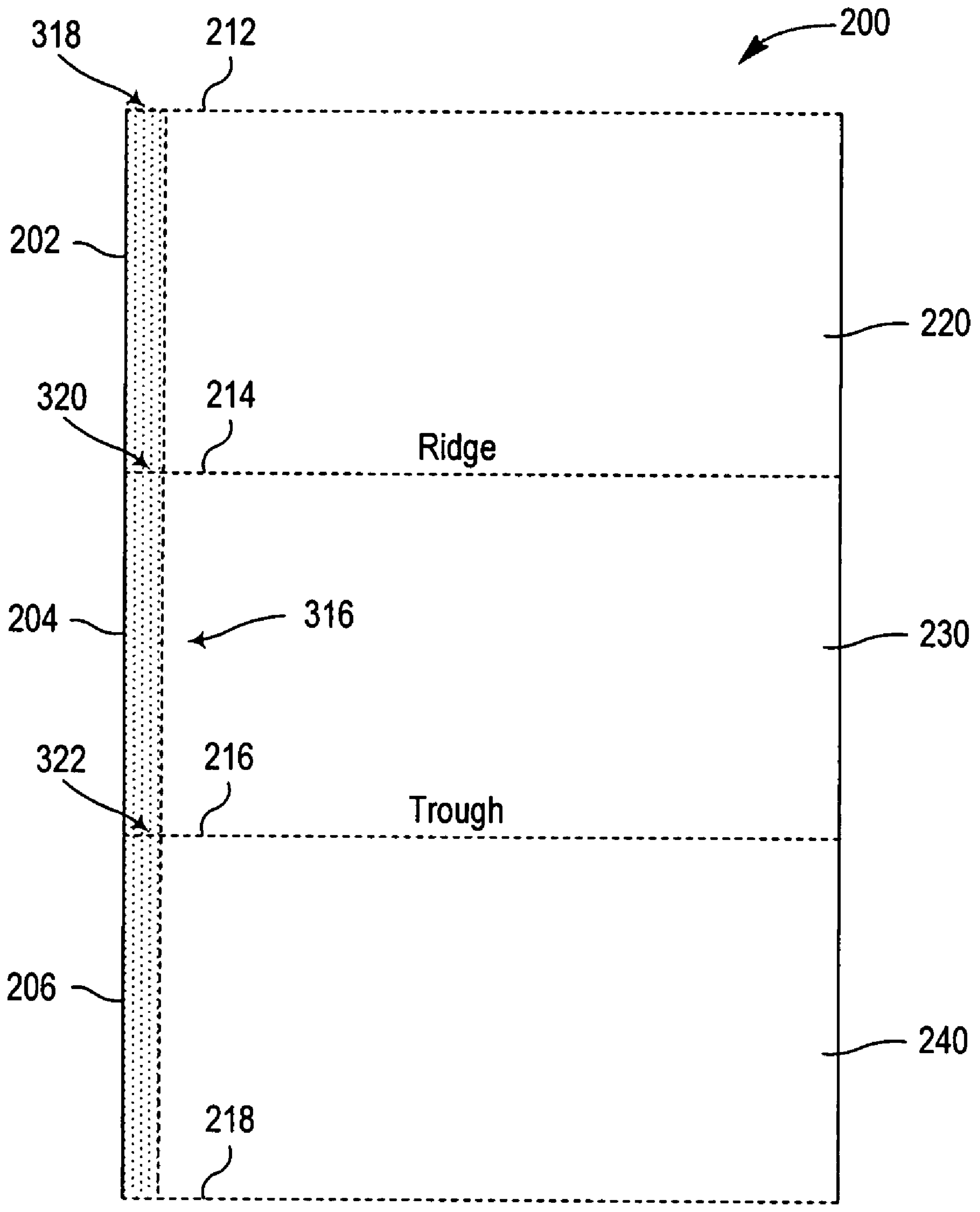
FIG. 3C illustrates an example vertical clear zone scanned by the dual-sided imaging direct thermal printer of FIG. 1 to detect one or more sense marks in accordance with FIGS. 3A-3B.

FIG. 3C illustrates an example vertical clear zone 316 representing a region or area of thermal print media 102 to be scanned or otherwise sensed by the dual-sided imaging direct thermal printer 100 of FIG. to detect one or more sense marks 302, 304 associated with a first side 300 thereof in accordance with the embodiment of FIG. 3A. The vertical clear zone 316 may be stored in a memory of the thermal printer 100 and may further be provided to the thermal printer via a communications controller by a host or auxiliary system, such as a point-of sale terminal (POS) (not shown) or a computer (not shown). The predefined vertical clear zone 316 may be adjustable as may be desired. The vertical clear zone 316 may be predefined to cover a sufficient area for sensor 112 of FIG. 1 to scan the thermal print media 102 as it may be moved along the feed path and to identify respective ridge and trough sense marks 302, 304 as represented by respective segments 320, 322 of the respective cross-perforations 214, 216. The width of the clear zone may be for example ¼ of an inch to one inch wide. Other widths may be used as desired. The sensor 112 (including related control electronics) is enabled to discriminate between alternating sense marks 302, 304, such as for example, based on machine readable characteristics (e.g., optical properties, mechanical properties, electrical properties, and the like). Although FIG. 3C was described for illustrative purposes in relation to the first side 300 of FIG. 3A, it is equally applicable to detecting sense marks 312, 314 of the second (reverse) side 310 of print media 102 in FIG. 3B.

Figure 4A:
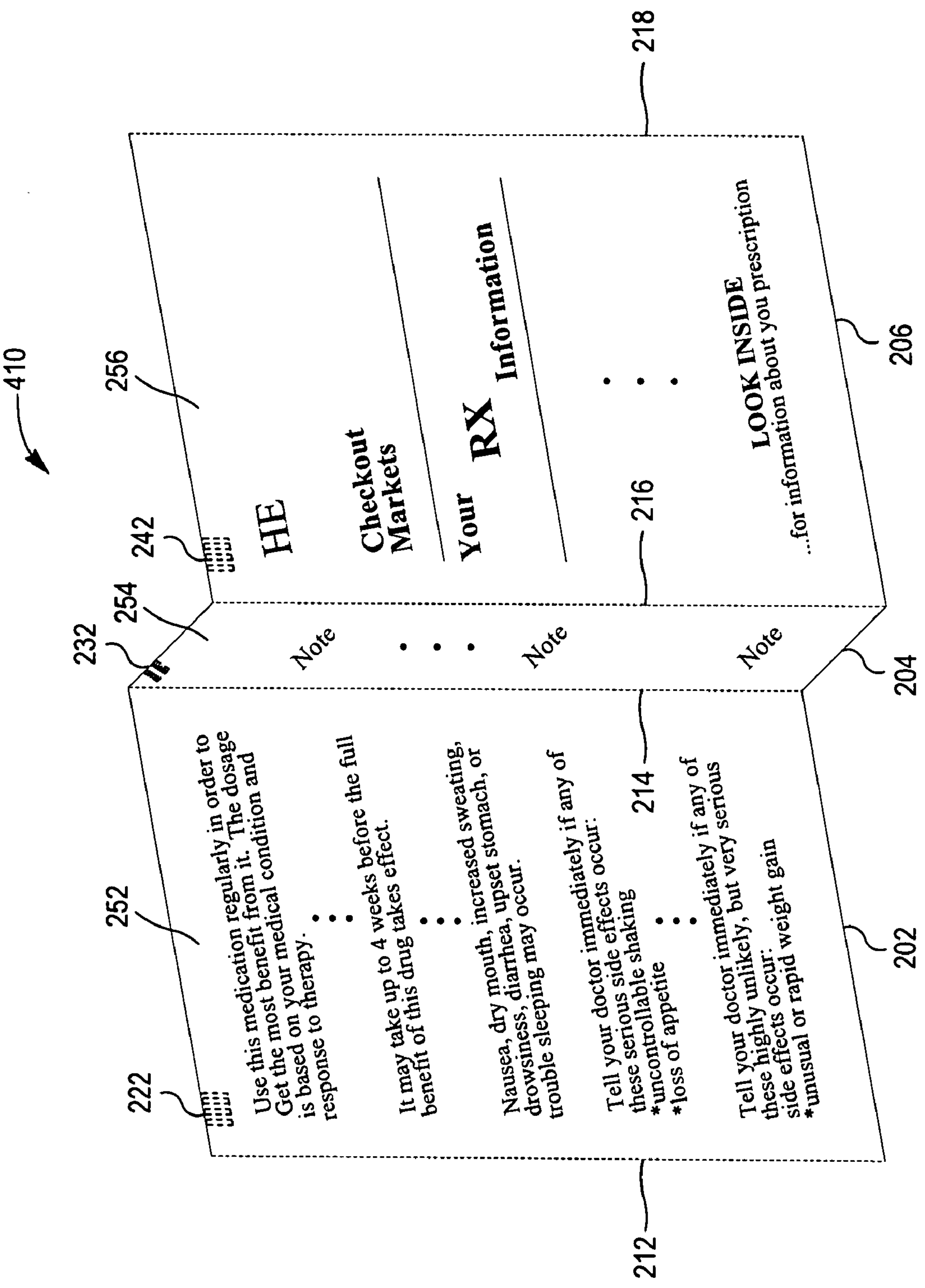
FIGS. 4A-4B illustrate an example first side and an example second side of a pharmacy script, respectively, in accordance with the example embodiment of FIGS. 1 and 2A-2B.

FIG. 4A illustrates an example first side 410 of an example pharmacy script printed using the dual-sided imaging direct thermal printer 100 and the dual-sided thermal print media 102, in accordance with FIGS. 1 and 2A-2C. The example pharmacy script of FIG. 4A comprises three panels 202, 204 and 206, which include respective imaging or printing surfaces 252, 254, 256, delineated by cross-perforations 212, 214, 216, 218. Each of the printing surfaces 252, 254, 256 may be imaged or printed with graphics, text and/or combinations thereof. Printing of the pharmacy script will be described below in greater detail. However, it is worthwhile to mention here that in order to make sure that the first or front printing surface 256 of panel 206 opens from right to left, does not fanfold to the interior, and orients up on the first panel 206 when printed, the pharmacy script is printed in a first-in-last-out (FILO) order using appropriate alternating sense marks 222, 232, 242 described in reference to FIGS. 1 and 2A-2C. This dictates that the panel 202 is printed first, followed by panel 204 and completed with the first or front printing surface 256 of first panel 206. In this way, as the pharmacy script is printed, it fanfolds into its natural fan-folded shape before printing or fan-folded into the fan-folded shape with the printed surface 256 of first panel 206 orienting up and panel 206 opening from right to left, facilitating an effective and convenient pharmacy script.

Further with reference to FIG. 4A, once the panels of the pharmacy script are printed or imaged on the thermal print media 102, including for example panels 202, 204, 206, the panels are detached or cut at the last printed panel 206 at a cross-perforation (or cut) 218 along the width of the lower edge of the last part 206. The detached panels 202, 204, 206 fan-fold along respective cross-perforations 214 and 216 into a properly oriented fan-folded pharmacy script. As illustrated in FIG. 4A, the sense marks 222, 232 and 242 (shown as dashed hidden line format for reference purposes) are disposed on the second (reverse) side of the pharmacy script illustrated in FIG. 4B below and thus are not directly visible from the first side 410. It should further be noted that any drug-related information that must be concealed in accordance with federal law may be printed or imaged on printing or imaging surfaces 252, 254 of the first side 410 to be folded to the interior of the pharmacy script for added privacy.

Figure 4B:
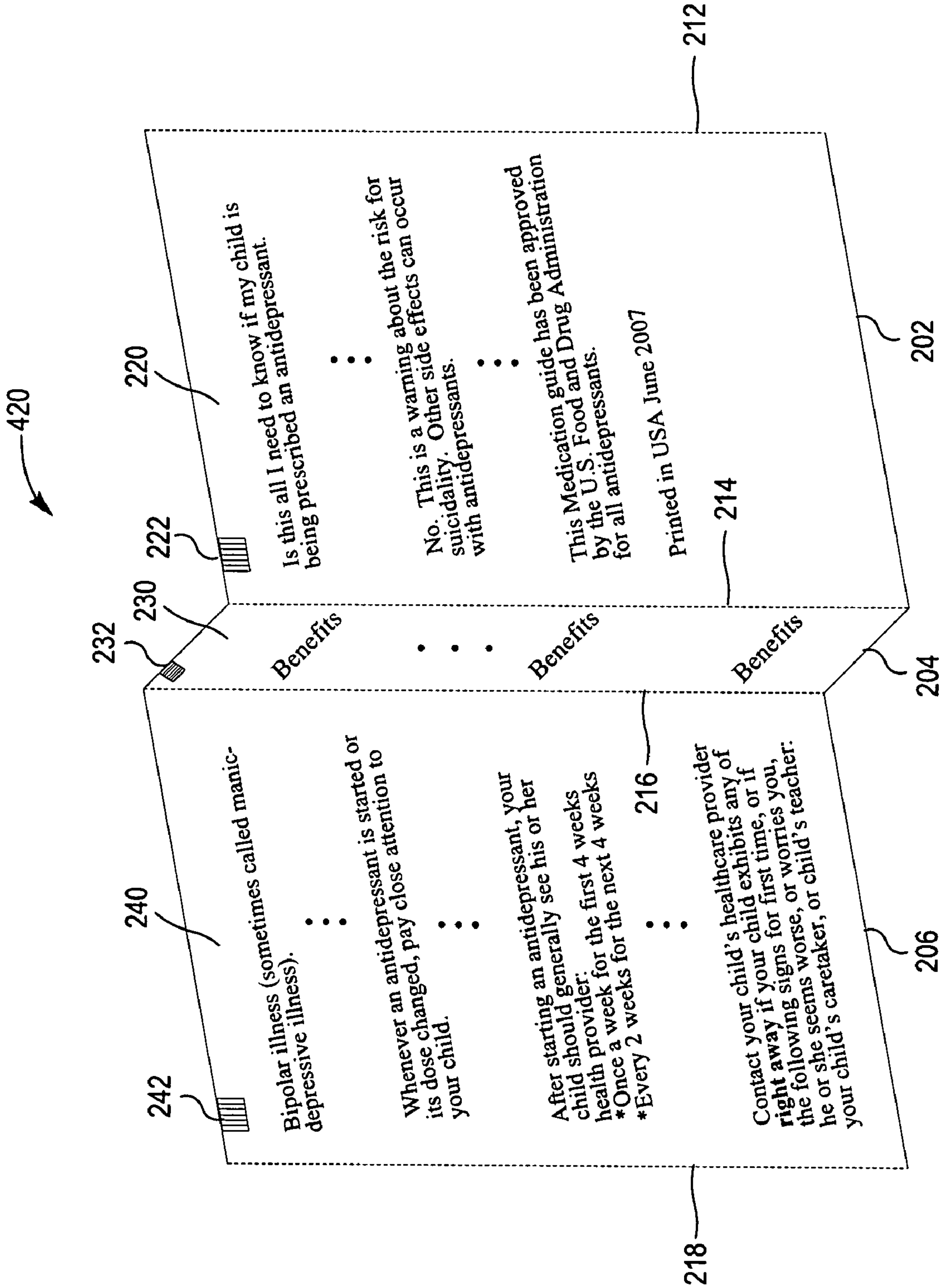

FIG. 4B illustrates an example second (reverse) side 420 of an example pharmacy script of FIG. 4A printed using the dual-sided imaging direct thermal printer 100 and the dual-sided thermal print media 102, in accordance with FIGS. 1 and 2A-2C. Each of the panels 202, 204 and 206 of the reverse side 420 comprises a respective imaging or printing surface 220, 230 and 240 and sense marks 222, 232, 242 thereon. It is noted that the respective sense marks 222, 232, 242 are not directly visible on the first side 410 illustrated in FIG. 4A above. Each of the printing surfaces 220, 230 and 240 may be imaged or printed with graphics, text and combinations thereof. As described above, the printed thermal print media 102 may be detached or cut at the last printed panel 206 at a cross-perforation (or cut) 218 along the width of the lower edge of the last part 206. The detached panels 202, 204, 206 fan-fold along respective cross-perforations 214 and 216 into a fan-folded pharmacy script, with sense marks 232 and 242 fan-folded to the interior of the pharmacy script. As there are an uneven number panels in the example printed pharmacy script, the last sense mark 222 may be visible on the outside of the pharmacy script on the second side 420 thereof. It should further be noted that as the print media 102 naturally cascades, any drug-related information that must be concealed in accordance with federal law may be printed or imaged on printing or imaging surfaces 230, 240 of the reverse side 420 to be folded to the interior of the pharmacy script for added privacy.

Figure 5A:
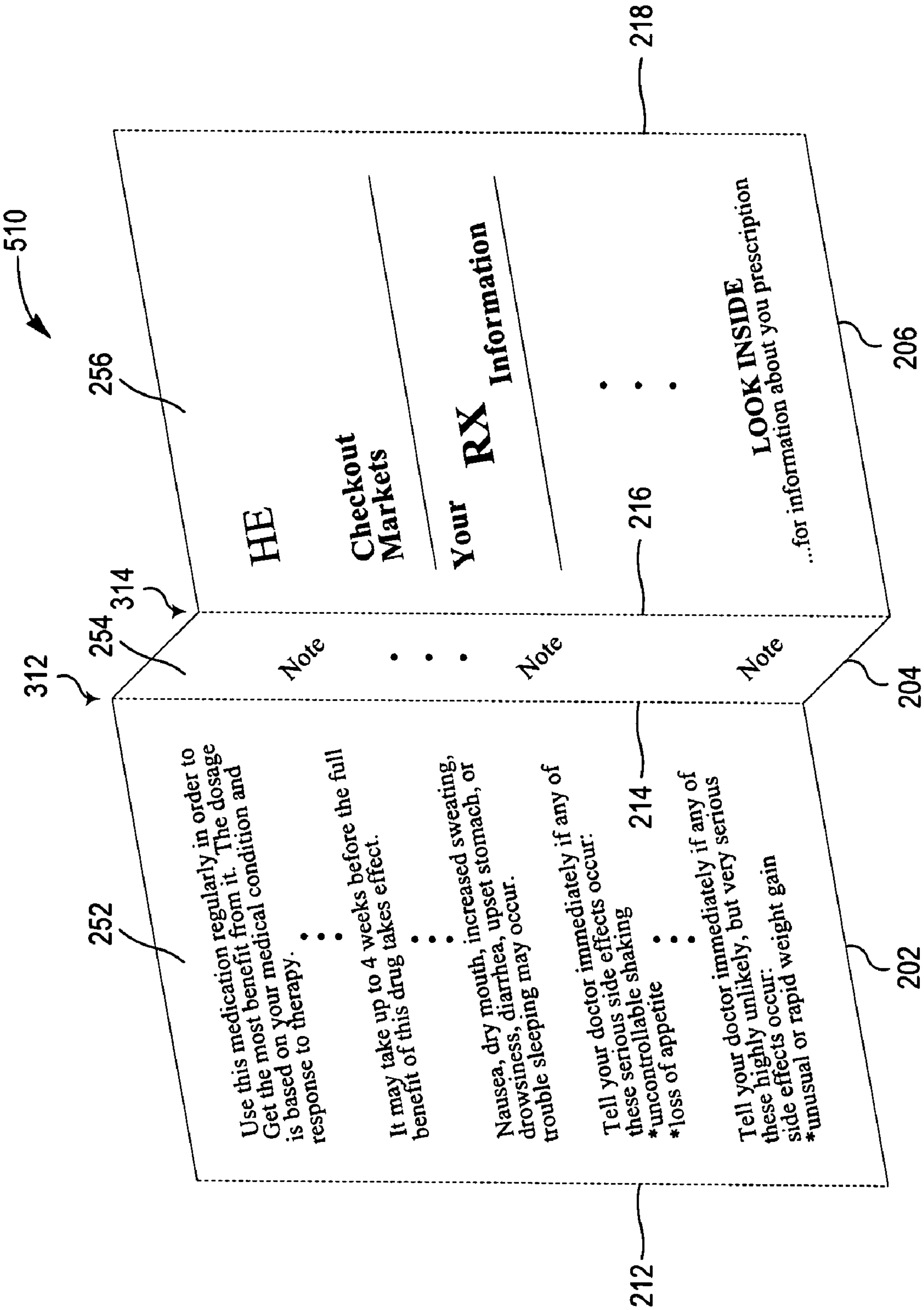
FIGS. 5A-5B illustrate an example first side and an example second side of a pharmacy script, respectively, in accordance with the example embodiment of FIGS. 1 and 3A-3B.

FIG. 5A illustrates an example first side 510 of an example pharmacy script printed using the dual-sided imaging direct thermal printer 100 and the dual-sided thermal print media 102, in accordance with FIGS. 1 and 3A-3C. The example pharmacy script of FIG. 5A comprises three panels 202, 204 and 206, which include respective imaging or printing surfaces 252, 254, 256, delineated by cross-perforations 212, 214, 216, 218. Each of the printing surfaces 252, 254 and 256 may be imaged or printed with graphics, text and/or combinations thereof. Printing of the pharmacy script will be described below in greater detail. However, it is worthwhile to mention here that in order to make sure that the first or front printing surface 256 of panel 206 opens from right to left, does not fanfold to the interior, and orients up on the first panel 206 when printed, the pharmacy script is printed in first-in-last-out (FILO) order using appropriate alternating sense marks 302, 304 (FIG. 3A) (or alternating sense marks 312, 314 of FIG. 3B) described in reference to FIGS. 1 and 3A-3C. This dictates that the panel 202 is printed first, followed by panel 204 and completed with the first or front printing surface 256 of first panel 206. In this way, as the pharmacy script is printed, it fanfolds into its natural fan-folded shape before printing or fan-folded into the fan-fold shape with the printing surface 256 of the first panel 206 orienting up and panel 206 opening from right to left, facilitating an effective and convenient pharmacy script.

Further with reference to FIG. 5A, once the panels of the pharmacy script are printed or imaged on the thermal print media 102, including for example panels 202, 204, 206, the panels are detached or cut at the last printed panel 206 via a cross-perforation (or cut) 218 along the width of the lower edge of the last part 206. The detached panels fan-fold along respective cross-perforations 214 and 216 into a fan-folded pharmacy script. As illustrated in FIG. 5A, the sense marks 312, 314 represent trough and ridge folds at respective cross-perforations 214, 216 that do not obstruct printing on the first side 510. It should further be noted that any drug-related information that must be concealed in accordance with federal law may be printed or imaged on printing or imaging surfaces 252, 254 of the first side 510 to be folded to the interior of the pharmacy script for added privacy.

Figure 5B:
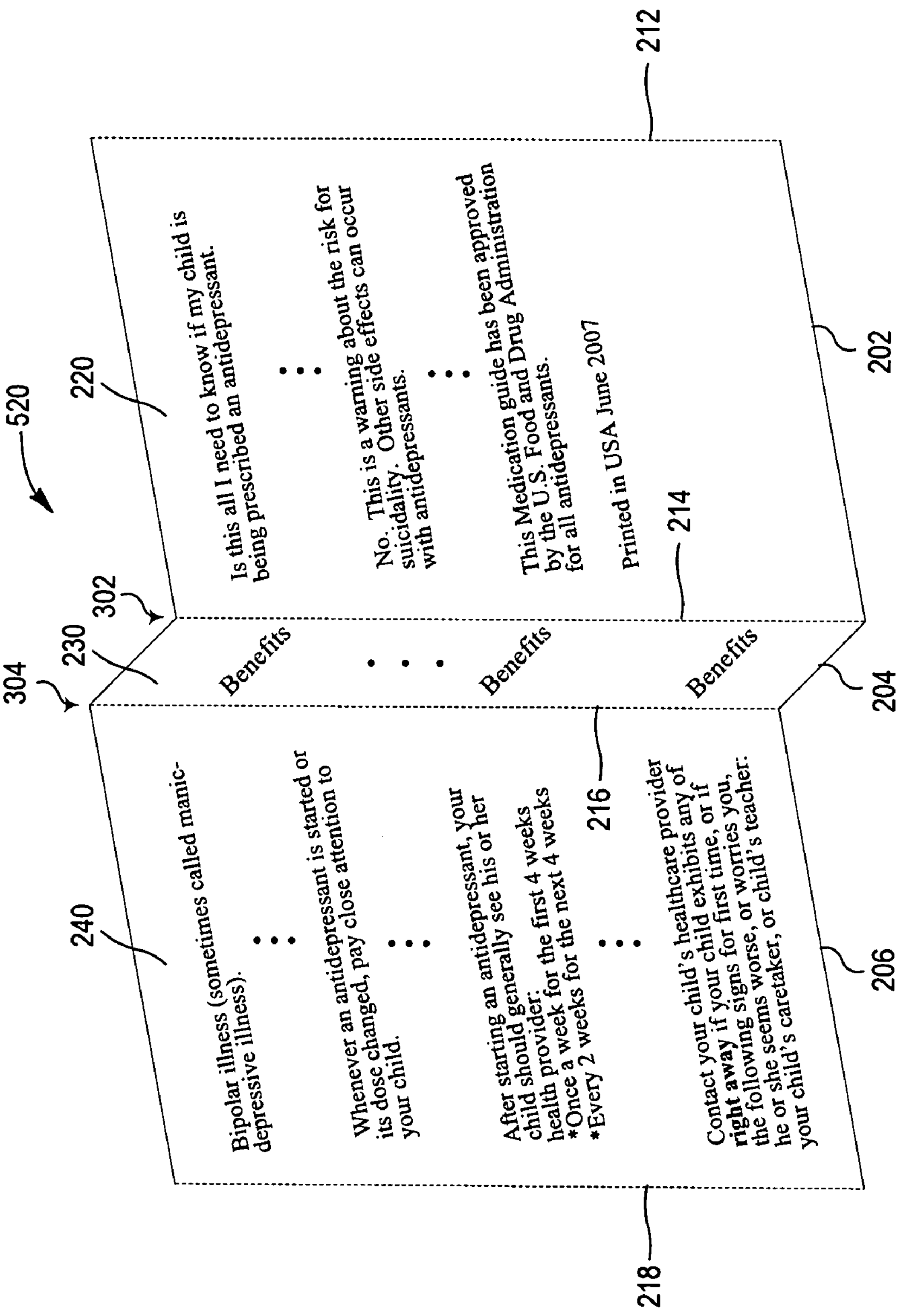

FIG. 5B illustrates an example second reverse side 520 of an example pharmacy script of FIG. 5A printed using the dual-sided imaging direct thermal printer 100 and the dual-sided thermal print media 102, in accordance with FIGS. 1 and 3A-3C. Each of the panels 202, 204 and 206 of the reverse side 520 comprises a respective imaging or printing surface 220, 230, 240. Each of the printing surfaces 220, 230, 240 may be imaged or printed with graphics, text and combinations thereof. As described above, the printed thermal print media 102 may be detached or cut at the last printed panel 206 via a cross-perforation (or cut) 218 along the width of the lower edge of the last part 206. The detached panels 202, 204, 206 fan-fold along respective cross-perforations 214 and 216. Similarly to the first side 510, the sense marks 302, 304 represent ridge and trough folds at respective cross-perforations 214, 216 that do not obstruct printing on the second side 520. It should further be noted that any drug-related information that must be concealed in accordance with federal law may be printed or imaged on printing or imaging surfaces 230, 240 of the reverse side 520 to be folded to the interior of the pharmacy script for added privacy.

Figure 6:
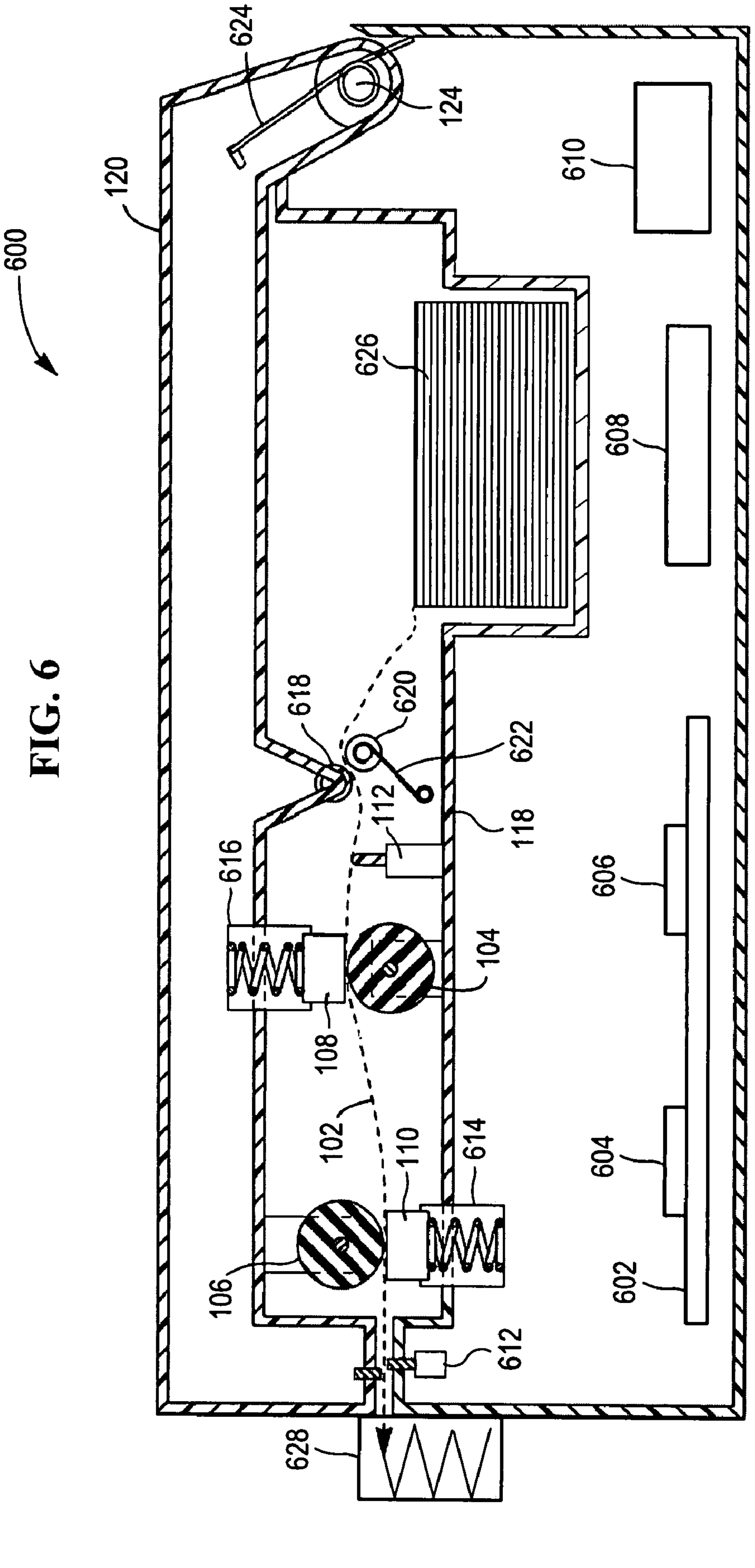
FIG. 6 illustrates a schematic of a partial centerline elevation view of an example dual-sided imaging direct thermal printer in accordance with FIG. 1.

FIG. 6 illustrates a schematic 600 of a partial centerline elevation view of an example dual-sided imaging direct thermal printer in accordance with FIG. 1. The example thermal printer comprises first print head 110, first platen 104, sensor 112 and first guide roller 620, all being coupled to a support arm 118 and all being on a first side of the thermal print media 102. The position of the sensor 112 may be determined based on design requirements of the example thermal printer and thermal media 102. It is noted that the feed path of thermal print media 102 is shown by dashed lines of and an arrow at one end of the thermal print media 102. It is further noted that thermal print media 102 may be drawn from a continuous fanfold thermal print media stack 626 housed in the interior of the example thermal printer between the first support arm 118 and the second support arm 120. It is to be noted that the thermal fan-folded print media stack 626 may be substituted with a continuous thermal print media roll (perforated into panels) and a roll support (not shown), similarly housed in the interior of the example thermal printer. The thermal printer 100 further comprises a second print head 108, second platen 106 and second guide roller 618, all being coupled to pivotable support arm 120 and all being on a second (reverse) side of the thermal print media 102. The pivotable support arm 120 pivots about the arm shaft (or hinge) 124 to allow replacement of the thermal print media 102 and servicing of the example thermal printer.

Further with reference to FIG. 6, when pivotable support arm 120 is closed in relation to support arm 118, the thermal print media 102 may be engaged between first print head 110 and opposed second platen 106, between second print head 108 and opposed first platen 104, and between first guide roller 620 and opposed second guide roller 618. Contact pressure with and tension of the thermal print media 102 may be maintained by spring loading first print head 110, second print head 108, and first guide roller 620 with spring mechanisms 614, 616 and 622, respectively. The example thermal printer also includes spring 624 that enables the pivotable arm 120 to open at a controlled rate in relation to arm 118, and thereby avoid, for example, uncontrolled closing of the arm 120 through force exerted on the arm 120 via the acceleration of gravity. The example thermal printer may also include an electronically activated mechanical cutting mechanism 612 to detach the thermal print media 102 upon completion of a print operation, such as the printing of the pharmacy script. Mechanism 612 may be used to detach a printed portion of the thermal print media 102 (e.g., booklet or pamphlet) along a cross-perforation of a last printed panel (e.g., see FIGS. 2A-5B), wherein registration of the print media 102 with the cutting mechanism 612 may be provided for by use of one or more sensors 112 for reading associated sense marks of the print media 102. The example thermal printer may further include a folder mechanism 628 that may be used to fanfold or to assist in fan-folding the thermal print media 102 as it is advanced into a fan-folded document (e.g., booklet or pamphlet) in order to make sure that the first or front printing surface 256 of panel 206 opens from right to left, does not fanfold to the interior, and orients up on the first panel 206 when printed. The registration of the print media 102 with the folder mechanism 612 may be provided for by use of one or more sensors 112 for reading associated sense marks of the print media 102.

With further reference to FIG. 6, it is noted that the print heads 108 and 110 are substantially in-line and face substantially opposed directions. As a result, the feed path of thermal print media 102 may be substantially a straight line path given the substantially in-line orientation of the print heads 108 and 110. This configuration facilitates frontal exiting of the thermal print media 102 from the example thermal printer. The in-line feed path also facilitates automation of thermal print media 102 replacement and feed, which includes allowing the thermal print media 102 to be automatically drawn from the second print head 108 and the first platen 104 through the second print head 110 and first platen 106, and vice-versa. Although the in-line orientation of print heads 108 and 110 is described, alternate orientations of the first head 110 in respect to the second print head 108, including varied angle orientations (e.g., 45, 90, 135 and 180 degrees), are possible based on particular design requirements of the example thermal printer, thermal print media 102 and/or desired media feed path.

Still with further reference to FIG. 6, the example thermal printer also comprises control electronics for controlling the operation of the thermal printer. The control electronics may include a motherboard 602, a microprocessor or central processing unit (CPU) 604, and memory 606, such as one or more dynamic random access memory (DRAM) and/or non-volatile random access memory (NVRAM) print buffer memory elements. The example thermal printer further comprises a communications controller 608 for communicating with one or more host or auxiliary systems, such as a point-of sale terminal (POS) (not shown) or a computer (not shown) for input of data to and output of data from the direct thermal printer. Communication controller 608 may support universal serial bus (USB), Ethernet and or wireless communications, among others. The data for printing would typically be supplied by a host POS terminal or a computer communicating with the example thermal printer via the communication controller 608. Supplemental data for printing, such as prescribed drug information, safety information and customer information may also be supplied by, for example, a network server (not shown) providing data directly to the thermal printer using the communication controller 608, or indirectly through the host POS terminal or computer. The supplemental data for printing may vary depending upon the identification of the customer and prescribed drug.

Yet further with reference to FIG. 6, memory 606 of the example dual-sided direct thermal printer may have a page data storage area to store or buffer a plurality of pages (of respective panels) of the pharmacy script to be printed or imaged. Page data for printing may be supplied by the POS terminal or computer using the communication controller 608. The page data is buffered in the page data storage area until the last page of the last panel is received. Thereafter, the buffered pages are read from the page data storage area in first-in-last-out (FILO) order and printed or imaged using appropriate alternating sense marks described in reference to FIGS. 1 and 2A-5B to provide a fan-folded pharmacy script in which the front panel opens from right to left, the first page of the pharmacy script does not fanfold to the interior and orients up on the first panel when printed.

Lastly with reference to FIG. 6, memory 606 of the example dual-sided direct thermal printer may have a predefined print data storage area to store one or more blocks of predefined print data to be repetitively printed on one or both sides of one or more panels of the print media 102. The blocks of predefined print data may include, for example, a store identifier, a logo, an advertisement, a serialized cartoon, and the like. In addition, the blocks of predefined data may further include legal information such as warranties, disclaimers, return policy, regulatory information, and the like. The predefined print data may be printed along with data submitted by application software associated with the POS terminal or computer on the same or the opposite media side of thermal print media 102. The predefined print data blocks stored in the predefined print data storage area may include information drawn from a database and personalized based on customer past purchases and/or targeted advertising based on the prescription filled, time of year, holiday season, and the like. The predefined print data blocks may be individually, alternately, or variably selected for printing through use of a hardware or software switch 610, as may be the location or side of the media on which they are printed, and the like.

Figure 7:
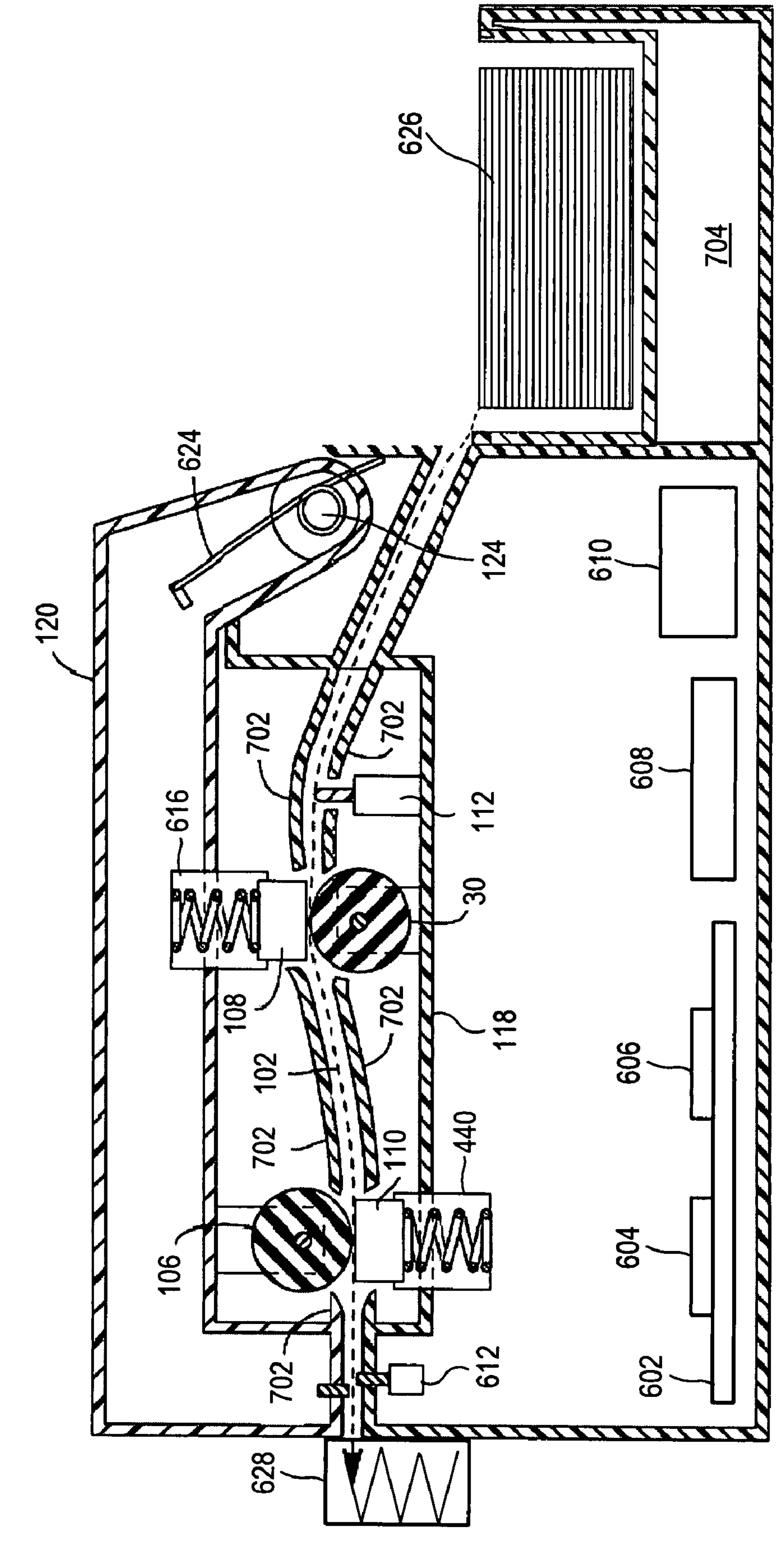
FIG. 7 illustrates another schematic of a partial centerline elevation view of an example dual-sided imaging direct thermal printer in accordance with FIG. 1.

FIG. 7 illustrates another schematic 700 of a partial centerline elevation view of another example dual-sided imaging direct thermal printer in accordance with FIG. 1. In this instance, the example thermal printer may be designed to support thermal print media 102, such as a continuous thermal fan-folded print media stack 626, on the exterior of the example thermal printer via stack support 704 for facilitating ready replacement of the continuous thermal fan-folded print media stack 626. It is to be noted that print media stack 626 may be substituted with a continuous thermal print media roll and the stack support 704 may be substituted with a roll support. The print heads 108 and 110 are substantially in-line and face substantially opposed directions, which provides a substantially in-line feed path that allows automated replacement and loading of thermal print media 102. One or more guides 702 may further be provided to align the thermal print media 102, and thereby facilitate automated loading and feed of the thermal print media 102.

Figure 8:
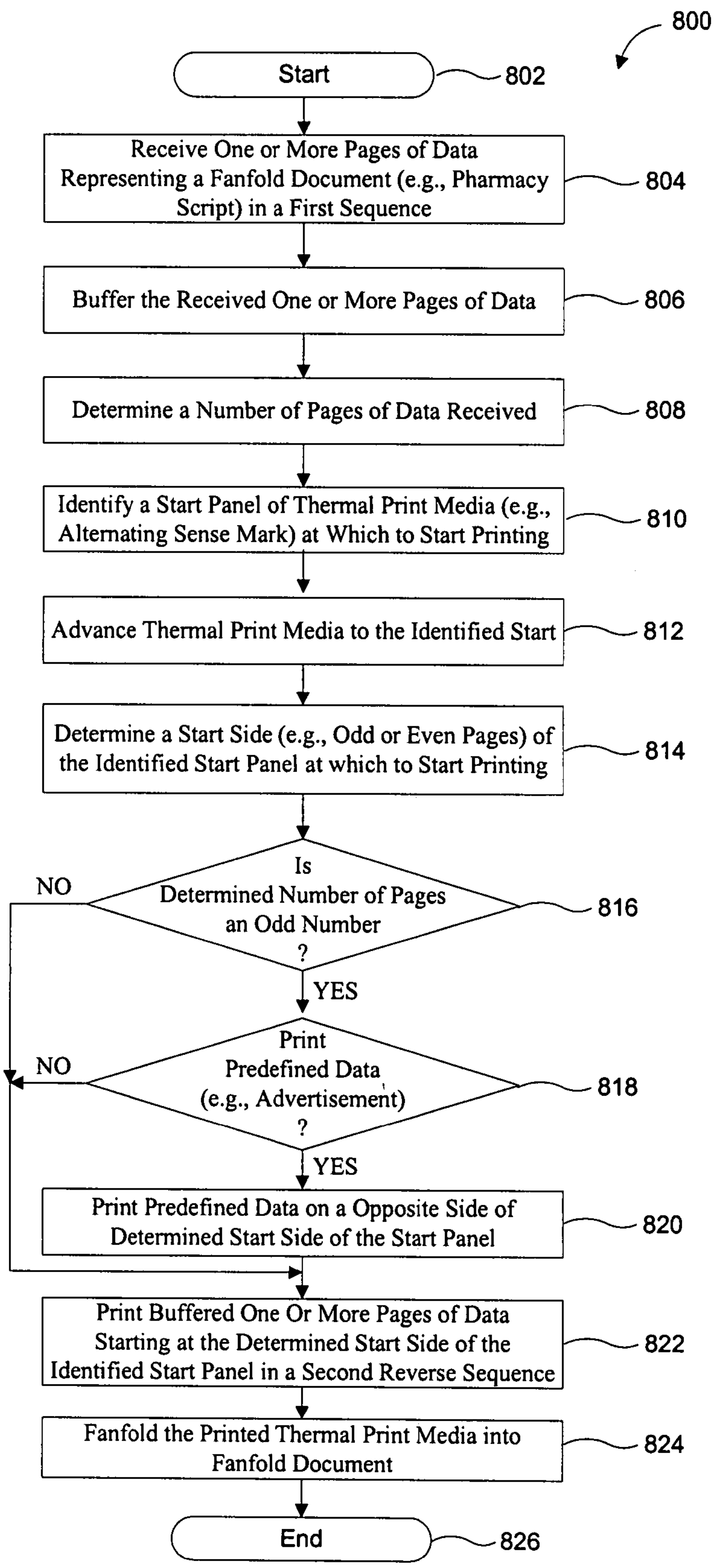
FIG. 8 is flowchart that illustrates an example method to print a pharmacy script on dual-sided thermal media using a dual-sided imaging direct thermal printer in accordance with FIGS. 1-7.

FIG. 8 is flowchart that illustrates an example method 800 to print a fanfold document, such as a pharmacy script on dual-sided thermal media 102 using the dual-sided imaging direct thermal printer 100 in accordance with FIGS. 1-7. The example method 800 starts at operation 802 in which a print operation is initiated via the POS terminal or computer. At operation 804, the direct thermal printer 100 receives a plurality of pages of data representing a pharmacy script in, for example, a first-in-first-out (FIFO) sequence via the communication controller 608. At operation 806, the received sheets of data are buffered in the page data storage area of memory 608 until the last page of data of the pharmacy script is received. At operation 808, the microprocessor 604 determines a number of pages of data received. It should be noted that, in some embodiments, the number of pages may be provided by the POS terminal or computer, or may be independently counted by the microprocessor 604 (e.g., incrementing a counter) as the pages of data are received, and the like. At operation 810, the microprocessor 604 identifies a panel of the dual-sided direct thermal print media 102 at which to start printing the fanfold document (e.g., pharmacy script) such that, for example, the document opens from left to right, the first page of the document does not fanfold to the interior, and the document finishes printing with the cover page oriented face up on the last printed panel as shown in FIGS. 4A-5C.

Further with reference to FIG. 8, identifying a desired panel in practice may comprise identifying a sense mark associated with the desired panel such that printing is initiated and/or otherwise performed on the desired panel by sense of and reference to an appropriate sense mark. In one embodiment, a sense mark 222, 232, 242 associated with fan folded print media 102 may be assigned a designation of zero (0) or one (1) wherein, for example, a sense mark associated with a panel face having a ridge fold or cross-perforation at its leading edge (e.g., sense mark 232 associated with printing surface 230 of panel 204, associated with a second side 420 of the prescription script of FIG. 4B) may be designated as zero (0), while a panel face having a trough fold or cross-perforation leading edge (e.g., sense mark 242 of printing surface 240 of panel 206, associated with the second side 420 of the prescription script of FIG. 4B) may be designated as one (1). Once such panels and faces thereof have been identified by their respective sense marks, a panel for initiating printing may be selected utilizing the appropriate sense mark. This may be accomplished by computing the following formula:

$$SenseMark = \mathrm{Mod}\left(Roundup\left(\frac{\text{No. Pages}}{2}\right), 2\right).$$

Further with reference to the foregoing formula of FIG. 8, as the sense marks alternate, representing, for example, alternating troughs or ridges in the thermal print media 102, the microprocessor 604 identifies the particular alternating sense mark (e.g., trough or ridge) or number (e.g., zero or one) at which to start printing based on the number of pages in the fanfold document (e.g., pharmacy script) as follows. More specifically, the determined number of pages from operation 808 is divided by a factor of two (No. of Pages/2) to determine a number of panels required for printing of the received one or more pages of data, as each panel of the dual sided thermal media 102 includes two printable sides. As the determined number of panels may be a fraction, the determined number of panels is rounded up to an integer (Roundup). A modulus of two (e.g., remainder when operand is divided by two) of the rounded number of panels is then determined to identify a particular alternating sense mark (e.g., trough or ridge) by its corresponding number designation (e.g., zero or one). The identified alternating sense mark is associated with and indicates a particular panel of the thermal media 102 (e.g., panel associated with a cross-perforation that forms a trough or ridge) on which the thermal printer 100 is to begin printing.

Still further with reference to FIG. 8, at operation 812 the microprocessor 604 may cause or otherwise instruct the direct thermal printer 100 to advance the direct thermal media 102 to a panel associated with an identified alternating sense mark. More specifically, as the thermal print media 102 is taken from a continuous fan-folded print media stack (or print media roll) and moved along the feed path toward print heads 108 and 110 for dual-sided imaging, a sensor 112 acquires the predefined vertical clear zone 262, 316 via microprocessor 604 from memory 606 and may scan a predefined vertical clear zone 262, 316 of such media 102 to locate a first instance of the identified sense mark to initiate printing on an associated panel.

As an example with reference to FIG. 8, if a document such as a pharmacy script includes 5 pages for printing, the microprocessor 604 divides 5 by 2, resulting in 2.5 panels to print the pharmacy script. The determined panel number is then rounded up to an integer, resulting in 3 panels for printing of the pharmacy script. The microprocessor 604 thereafter computes the modulus (e.g., determines remainder) of 3 divided by 2, (e.g., Mod (3, 2)), which results in 1. The microprocessor 604 may then instruct or otherwise cause the direct thermal printer 100 to advance the direct thermal media 102 to a panel associated with the alternating sense mark represented by 1 (e.g., panel 202 having sense mark 222) to initiate printing of the document (e.g., pharmacy script).

As another example with reference to FIG. 8, if the document such as a pharmacy script is determined to include 6 pages of data, the microprocessor 604 divides 6 by 2, resulting in 3 panels to print the pharmacy script. The determined panel number is rounded up to an integer, resulting in 3 panels for printing of the pharmacy script. The microprocessor 604 thereafter computes the modulus of 3 divided by 2 (e.g., Mod (3, 2)), which also results in 1, causing the microprocessor 604 to instruct or otherwise cause the direct thermal printer 100 to advance the direct thermal print media 102 to a panel associated with the alternating sense mark represented by 1 (e.g., panel 202 having sense mark 222), to initiate printing of the document (e.g., pharmacy script).

Still further with reference to FIG. 8, at operation 814, the microprocessor 604 determines a face or side of the identified panel at which to start printing the received one or more pages of data. With reference to the foregoing modulus calculations, where the modulus is one and the number of pages is determined to be an odd number (e.g., 5), the microprocessor 604 may instruct or otherwise cause printing of a last page of data to be initiated on a first (front) face 252 of an identified start panel 202. Likewise, where the modulus is one and the number of pages is identified to be an even number (e.g., 6), the microprocessor 604 may instruct or otherwise cause printing of the last page of data to be initiated on a second (reverse) face 220 of the identified start panel 202 (e.g., as shown in FIG. 4B). Such methodology results in selective or priority printing of pages of data on an interior panel face (e.g., faces 230, 240, 252, 254 of the pharmacy script of FIGS. 4A and 4B) rather than on an exterior panel face (e.g., faces 220, 256 of the pharmacy script of FIGS. 4A and 4B) which, for example, protects privacy of the printed information.

In a further example with reference to operations 808-814, if the document such as a pharmacy script is determined to include 3 or 4 pages, the microprocessor 604 divides that number of sheets by 2 and rounds the result up to an integer of 2 panels. The microprocessor 604 thereafter computes Mod (2, 2), which results in 0, causing the microprocessor 604 to instruct or otherwise cause the direct thermal printer 100 to advance the direct thermal media 102 to a panel associated with the alternating sense mark represented by 0 (e.g., panel 204 having sense mark 232), for initiating printing thereof. In this case, where the modulus is zero and the number of pages for printing is odd (e.g., 3), printing of a last page of data may be initiated on a second (reverse) face 230 of the identified start panel 204. Likewise, where the modulus is zero and the number of pages is even (e.g., 4), printing of a last page of data may be initiated on a first (front) face 254 of the identified start panel 204. As described hereinabove, such methodology results in selective or priority printing of sheets or pages of data on an interior panel face (e.g., faces 230, 240) of, for example, a pharmacy script, rather than an exterior panel face (e.g., faces 254, 256) of the pharmacy script which, inter alia, protects privacy of the printed information.

In yet another example with reference to operations 808-814, if the document such as a pharmacy script includes 1 or 2 pages, similarly to the foregoing examples, the microprocessor 604 may divide that number of sheets by 2 and round the result to the next highest integer of 1 panel. The microprocessor 604 thereafter may compute Mod (1, 2), which results in 1. In this case, the microprocessor 604 may then instruct or otherwise cause the direct thermal printer 100 to advance the direct thermal media 102 to a next available panel to initiate printing thereon as any given panel provides a required amount of media 102 for printing of 1 or 2 sheets or pages of data. However, as discussed above, since the modulus is one, the microprocessor 604 may still instruct or otherwise cause printing of a last page of data to be initiated on a second (reverse) face 220, 230, 240 of the next available panel 202, 204, 206 where the pharmacy script includes two (e.g., an even number of) pages for, inter alia, privacy purposes. Likewise, where the pharmacy script includes one page, such page may also be printed on a second (reverse) face 220, 230, 240 or such other face of the next available panel as will exit the thermal printer 100 printed side down to, inter alia, likewise maintain privacy of the printed information. Alternatively, such one page may also be printed on first (front) face 252, 254, 256 or such other face of the next available panel as will exit the printer 100 printed side up.

Still further with reference to FIG. 8, as described with regard to the examples above, if the pharmacy script includes 1, 2, 5 or 6 panels, a first alternating sense mark (e.g., indicated by 1) is identified. However, if the pharmacy script includes 3, 4, 7 or 8 panels, a second alternating sense mark (e.g., indicated by 0) is identified. This formula may be extended to identify a starting sense mark for any other number of page of data of a particular document, such as pharmacy script (.e.g., 9, 10, 11, 12, 13, . . . n pages of data).

Yet further with reference to FIG. 8, if at operation 816 the microprocessor 604 determines that the number of received pages is an odd number, then the method 800 continues at operation 818 where the microprocessor 604 determines whether to print predetermined data (e.g., advertising, coupon, or the like) as a last or back (e.g., second or reverse) side of the document to be printed (e.g., side or face 220 of back panel 202). Alternatively the method continues at operation 822. The determination as to whether to print predetermined data on a back side of the document (e.g., pharmacy script) may be based on a particular promotional date or period, holiday season, as well as other criteria not enumerated. If it is determined that the predefined data is to be printed, the method 800 continues at operation 820. Alternatively the method continues at operation 822. At operation 820, the microprocessor 604 may cause or otherwise instruct print head 110 to print the predefined data on the back side of the determined starting side of the identified panel to which the thermal printer 100 has been advanced. At operation 822, the microprocessor 604 may cause or otherwise instruct the print heads 108, 110 to print the one or more buffered pages of data starting at the determined starting side of the identified panel in last-in-first-out (LIFO) sequence. At operation 824, the microprocessor 604 may cause or otherwise instruct the folder mechanism 628 fanfold the advancing printed thermal print media 102 into the fanfold document (e.g., pharmacy script).

With regard to operations 820, 822, 824 of FIG. 8, when the sensor 112 detects an alternating sense mark associated with the identified starting panel in the vertical clear zone 262, 316, it sends a signal to microprocessor 604, which utilizes the signal as timing device to control activation of one or more of the print heads 108 and 110 to begin printing or imaging the particular sides of each panel on the thermal print media 102 in accordance with FIGS. 2A-8. The predefined data and the buffered pages are printed or imaged using the appropriate alternating sense mark(s) described in reference to FIGS. 2A-8 to provide a fan-folded document such as a pharmacy script in which, for example, the front panel opens from right to left, the front page does not fanfold to the interior and orients up on the first panel when the document is printed. It is to be noted that irrespective of the identified alternating sense mark, the alternating sense marks may be detected and used as timing devices to control activation of one or more of the print heads 108 and 110 to print respective sheets of data. It is further noted that the detection an alternating sense mark by the sensor 112 may also be used to control the activation of the cutting mechanism 612 to detach the thermal print media 102 upon completion of some or all of the print operation as the thermal print media 102 is output to the outside the thermal printer 100, or to cutoff the one or more unused panels of print media 102 as an identified panel is sought to initiate printing. Activation of the cutting mechanism 612 may be timed to cut the thermal print media 102 at a specified location, such as along a cross-perforation 212, 214, 216, 218 of the thermal print media 102, to form a complete pharmacy script. It is also noted that the detection of an alternating sense mark by the sensor 112 may also be used to control the folder mechanism 628 to fanfold the advancing thermal print media 102 to form the complete pharmacy script, which opens from left to right, the first page of which does not fanfold to the interior, and which finishes printing with the cover page oriented face up on the last printed panel as described herein. The method 800 ends at operation 826.

Additional variations are possible, including designating a sense mark associated with a panel face having a ridge fold cross-perforation at its leading edge (e.g., cross-perforation 212 of face 252 of panel 202 associated with a first side 410 of the prescription script of FIG. 4A) as zero (0), and a panel face having a trough fold cross-perforation leading edge (e.g., cross-perforation 214 of face 254 of panel 204 associated with the first side 410 of the prescription script of FIG. 4A) as one (1), or via one or more alternate or additional alternate alpha-numeric, decimal, hexadecimal, and like designations.

Further, in some embodiments, one or more sensors 112 may be used to identify which face 220, 252, 230, 254, 240, 256 of a given panel 202, 204, 206 faces up or will face up upon printing by and/or exit from a printer 100, which information may subsequently be used to select a particular page of print data for printing on a particular face 220, 252, 230, 254, 240, 256 of a given panel 202, 204, 206 so that, for example, a cover page data ends up on top face 256 of a printed script document, and/or remaining data is preferentially printed on one or more interior panel faces 230, 240, 252, 254, and the like.

Additionally, while the above described embodiments discuss use of two, alternating sense marks denoting, for example, a panel's position with regard to one or more ridge or trough folds or cross-perforations, in some embodiments, a series of single sense marks on or associated with alternating panels 202, 206 may be utilized wherein an intermediate, undesignated or unmarked panel 204 may be identified by difference based on its position along a media feed path with respect to a marked or otherwise identified panel 202, 206.

Still further in some embodiments, ridge or trough folds or cross-perforations may be tracked by printing an even number of panels for each printed document (e.g., pharmacy script). More specifically, if it is determined that an odd number of panels would be required for a particular pharmacy script, an extra blank panel could be included at the end of (as the first panel) the particular pharmacy script to be printed for an even number of panels. As even number of panels for each document may be printed, this may ensure that a successive or next document (e.g., pharmacy script) may be positioned in proper position for printing on a next panel after the previously printed document. Therefore, ensuring that the print media 102 when loaded into printer 100 is registered with the printer 100 to a panel that represents an even number of panels for a document to be printed may ensure correct position for printing of successive documents that include even number of panels.

Likewise, while the above embodiments have been described with regard to a last-in-first-out (LIFO) data print sequence, they are equally applicable to a first-in-first-out (FIFO) sequence wherein, for example, the print data is sent to the printer 100 such that first received page of data represents data designated for printing on a back panel of a document such as a pharmacy script, and a last received page of data represents data designated for printing on a cover panel of a document such as a pharmacy script.

Finally, while the above included embodiments have been described with regard to direct thermal printing, they are equally applicable to thermal transfer and combined thermal transfer and direct thermal printing, wherein a thermal printer such as the thermal printer 100 of FIG. 1 may further comprise one or more thermal transfer ribbons, and thermal media such as the thermal media 102 of FIG. 1 may further comprise one or more thermal transfer receptive coatings as disclosed in, for example, U.S. patent application Ser. No. 11/779,732 entitled "Two-Sided Thermal Printer", U.S. patent application Ser. No. 11/780,959 entitled "Two-Sided Thermal Transfer Ribbon", U.S. patent application Ser. No. 11/834,411 entitled "Two-Sided Thermal Media", and U.S. patent application Ser. No. 11/835,013 entitled "Selective Direct Thermal and Thermal Transfer Printing", the contents of which are hereby incorporated by reference herein.

In view of the foregoing, a dual-sided thermal media and a dual-sided thermal printer therefor to image a fanfold document (e.g., pamphlet or booklet), such as a pharmacy script, have been described. The format and design of the thermal media, including the alternating sense marks and cross perforations, provide for effectiveness, efficiency and savings in imaging variable length documents, such as pharmacy scripts. The thermal media may be advanced to a particular alternating sense mark to start printing based on a number of panels in the document, so that the document opens from right to left, the first page of the document does not fanfold to the interior and orients up on when the first panel is printed. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the description. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A dual-sided thermal printer to image a dual-sided media comprising a plurality of contiguous, alternating first and second thermally imageable panels distinguished by one or more associated sense marks, each of the imageable panels including first and second imageable sides, the printer comprising:

a first print head positioned proximate to a first platen;

a second print head positioned proximate to a second platen, the first print head being in a substantially opposed relation to the second platen and the second print head being in a substantially opposed relation to the first platen; and a microprocessor adapted to:

determine a starting panel of the alternating first and second thermally imageable panels of the dual-sided media on which to start imaging one or more received pages of data;

determine a starting side of the first and second imageable sides of the starting panel according to number of the one or more received pages of data;

control advancement of the dual-sided media to the starting panel using at least one of the one or more associated sense marks; and control activation of the first print head and the second print head to image the dual-sided media with the one or more received pages of data starting at the determined starting side of the determined panel.

2. The dual-sided thermal printer of claim 1, the printer further comprising:

a communications controller to receive the one or more pages of data; and a memory to buffer the one or more received pages of data according to a first sequence order, wherein the microprocessor is further adapted to control activation of the first print head and the second print head to image the dual-sided media with the buffered one or more pages of data starting at the determined starting side of the determined panel according to the first sequence order.

3. The dual-sided thermal printer of claim 2, wherein received one or more pages of data are buffered in the memory in a same order as the one or more pages of data are received.

4. The dual-sided thermal printer of claim 2, wherein received one or more pages of data are buffered in a reverse order from which the one or more pages of data are received.

5. The dual-sided thermal printer of claim 1, the printer further comprising:

a communications controller to receive the one or more pages of data; and a memory to buffer the one or more received pages of data according to a first sequence order;

wherein the microprocessor is further adapted to control activation of the first print head and the second print head to image the dual-sided media with the buffered one or more pages of data starting at the determined starting side of the determined panel according to a second sequence order that is opposite from the first sequence order.

6. The dual-sided thermal printer of claim 1, wherein the microprocessor is further adapted to determine a total number of the one or more pages of data that are received.

7. The dual-sided thermal printer of claim 6, wherein in determining the starting panel, the microprocessor is further adapted to:

divide the total number of pages of data received by a factor of two to determine a number of panels;

round up the determined number of panels a nearest panel; and calculate a modulus of a factor of two of the rounded up number of panels.

8. The dual-sided thermal printer of claim 6, wherein in determining the starting side, the microprocessor is further adapted to determine whether the total number of pages of data that are received is either odd or even.

9. The dual-sided thermal printer of claim 1, wherein the microprocessor is further adapted to:

determine whether to print predefined data; and control activation of the first print head or the second print head to image the predefined data on an opposite side of the starting side of the starting panel.

10. The dual-sided thermal printer of claim 1, further comprising a sensor that scans the dual-sided media as it is advanced to identify a first sense mark disposed on each of the first thermally imageable panels or a second sense mark disposed on each of the second thermally imageable panels.

11. The dual-sided thermal printer of claim 1, further comprising a sensor that scans the thermal media as it is advanced to identify a first sense mark comprising a ridge cross-perforation associated with the first thermally imageable panels or a second sense mark comprising a trough cross-perforation associated with the second thermally imageable panels.

12. The dual-sided thermal printer of claim 1, further comprising a folder mechanism to fan-fold the imaged dual-sided media into a fanfold document.

13. A dual-sided thermal printer to image a dual-sided media comprising a plurality of contiguous, alternating first and second thermally imageable panels distinguished by one or more associated sense marks, each of the imageable panels including a first and second imageable sides, the printer comprising:

a microprocessor adapted to:

determine a starting panel of the alternating first and second thermally imageable panels of the dual-sided media on which to start imaging one or more received pages of data;

determine a starting side of the first and second imageable sides of the starting panel; and control advancement of the dual-sided media to the starting panel using at least one of the one or more associated sense marks.

14. The dual-sided thermal printer of claim 13, wherein the microprocessor is further adapted to determine the starting side of the first and second imageable sides of the starting panel according to number of the one or more received pages of data.

15. The dual-sided thermal printer of claim 13, the printer further comprising a first print head and a second print head, and wherein the microprocessor is further adapted to control activation of the first print head and the second print head to image the dual-sided media with the one or more received pages of data starting at the determined starting side of the determined panel.

* * * * *